(12) United States Patent
Rojas et al.

(10) Patent No.: US 6,721,414 B1
(45) Date of Patent: Apr. 13, 2004

(54) CABLE MANAGEMENT SYSTEM

(75) Inventors: Michael J. Rojas, North Canton, OH (US); Amlan Dasgupta, Akron, OH (US); Timothy F. Corbett, Cuyahoga Falls, OH (US)

(73) Assignee: NEC America, Inc., Melville, NY (US)

( * ) Notice: Subject to any disclaimer, the term of this patent is extended or adjusted under 35 U.S.C. 154(b) by 0 days.

(21) Appl. No.: 09/375,740

(22) Filed: Aug. 17, 1999

(51) Int. Cl.$^7$ .............................. H04M 7/00; H04L 12/28
(52) U.S. Cl. .................. 379/221.01; 370/254; 345/969
(58) Field of Search ................. 379/221.01–221.07, 379/219, 220.01, 229, 230; 370/231, 235, 236, 237, 238, 245, 248, 406–408; 709/239, 241, 242

(56) References Cited

U.S. PATENT DOCUMENTS

| | | | |
|---|---|---|---|
| 4,736,363 A | 4/1988 | Aubin et al. | 370/400 |
| 4,741,027 A | 4/1988 | Maisel et al. | 379/221.01 |
| 4,831,649 A | 5/1989 | Mejane | 379/111 |
| 4,987,536 A | 1/1991 | Humblet | 709/241 |
| 5,021,968 A * | 6/1991 | Ferketic | 345/969 |
| 5,481,604 A | 1/1996 | Minot | 369/114.01 |
| 5,636,138 A * | 6/1997 | Gilbert et al. | 703/1 |
| 5,675,578 A | 10/1997 | Gruber et al. | 370/248 |
| 5,696,906 A | 12/1997 | Peters et al. | 705/34 |
| 5,878,128 A | 3/1999 | Kantola | 379/230 |
| 5,884,284 A | 3/1999 | Peters et al. | 705/30 |
| 5,901,141 A | 5/1999 | Gruber et al. | 370/248 |
| 5,923,646 A * | 7/1999 | Mandhyan | 370/254 |
| 6,249,571 B1 * | 6/2001 | Rojas | 379/112.01 |
| 6,301,422 B1 * | 10/2001 | Huang et al. | 370/238 |
| 6,310,883 B1 * | 10/2001 | Mann et al. | 370/408 |

FOREIGN PATENT DOCUMENTS

| | | |
|---|---|---|
| GB | 2299729 A | 10/1996 |

OTHER PUBLICATIONS

Problem Solving in Automated Design of External Connectins in an Automatic Process Control System. Authors: E.L. Gerlovin; A.L. Gol'din; V.A. Afinogenova; Journal: Pribory i Sistemy Upravleniya, No. 1, p. 12–14 Country of Publication, USSR., 1985.

Design of Highly Relible Optical Fiber Cable Network in Access Networks. Authors: Motoi Iwashita, Hisao Oikawa, Hideo Imanaka, Ryuji Toyoshima Publication, IEICE Trans. Commun., vol. E78–B, No. 7, Jul. 1995.

\* cited by examiner

*Primary Examiner*—Benny Q. Tieu
(74) *Attorney, Agent, or Firm*—Scully, Scott Murphy & Presser

(57) ABSTRACT

An article of manufacture is provided including a computer usable medium having a computer readable program code device embodied therein for graphically representing and managing a telecommunications cable system. Managing includes tracking all hardware components contained in the telecommunications cable system and the capacity of each hardware component. Preferably, the cable system includes a PBX switch and master database, and at least one adjunct system and database. The computer readable program code device interacts with the master database, which contains a copy of information contained in each PBX, adjunct system and each adjunct system and respective database, and provides a user with an ability to track all telecommunications system cabling and hardware components by unique identification number stored in a cable manager database by type. The cable manager database may be accessed by type such that connections of all communication cables, termination hardware components and cross-connects may be accessed to realize available circuit pathways, document existing circuits and adding new circuits, including selecting a shortest or most efficient path between jack and switch for the new circuit. The cable manager database identifies available system components for existing or new circuits, and generates reports which disclose which cables and components which make up the particular existing or new circuit are currently in use.

18 Claims, 42 Drawing Sheets

Non-Directed Weighted Graph

Non-Directed Weighted Graph

| Defined Positions | | |
|---|---|---|
| Term. Pos. | Type | Term Hard |
| WP-3453-001 | JACK | WP-3453 |
| BK-33-001 | STD | BK-33 |
| BK-33-002 | STD | BK-33 |
| BK-33-003 | STD | BK-33 |
| BK-33-004 | STD | BK-33 |
| BK-33-005 | STD | BK-33 |
| BK-33-006 | STD | BK-33 |
| BK-33-007 | STD | BK-33 |
| BK-33-008 | STD | BK-33 |
| BK-33-009 | STD | BK-33 |
| BK-33-0010 | STD | BK-33 |
| BK-33-0011 | STD | BK-33 |
| BK-33-0012 | STD | BK-33 |
| BK-33-0013 | STD | BK-33 |
| BK-33-0014 | STD | BK-33 |
| BK-33-0015 | STD | BK-33 |

Select Records

Figure 4

Select Records

File  Edit  Options

Selection | Advanced |

Select records that match the following:

Records that begin with: [CA-35]  In: [Cable Identifier ▼]

And:

Records that begin with: [        ▼]  In: [Cable Positions Available ▼]

And:

Records that begin with: [        ▼]  In: [        ▼]

[Select Now]
[Cancel]
[New Select]

Figure 5

| | |
|---|---|
| BCxxx | bonding conductor |
| BCDxxx | backbone conduit |
| Cxxx | cable |
| CBxxx | backbone cable |
| CDxxx | conduit |
| CTxxx | cable tray |
| ECxxx | equipment (bonding) conductor |
| EFxxx | entrance facility |
| ERxxx | equipment room |
| Fxxx | fiber |
| GBxxx | grounding busbar |
| HHxxx | handhole |
| ICxxx | intermediate cross-connect |
| Jxxx | jack |
| MCxxx | main cross-connect |
| MHxxx | manhole or maintenance hole |
| PBxxx | pullbox |
| Sxxx | splice |
| SExxx | service entrance |
| SLxxx | sleeve |
| TCxxx | telecommunication closet |
| TGBxxx | telecommunications grounding busbar |
| TMGB | telecommunications main grounding busbar |
| WAxxx | work area |

Defined Termination Hardware Types

| Type | Description |
|---|---|
| 66BLK-12 | 66 Block with 12 positions |
| 66BLK-24 | 66 Block with 24 positions |
| 66BLK-48 | 66 Block with 48 positions |
| PBX | Telephone Switch |
| WP-1 | Wall Plate with 1 positions |
| WP-2 | Wall Plate with 2 positions |
| WP-4 | Wall Plate with 4 positions |

Definition | Custom Fields

Number of Field Labels in Use: 3

Custom Label 1: color
Custom Label 2: connector
Custom Label 3: rating

Figure 7B

Defined Termination Hardware Types

| Term Hardware | Type | Space Ide |
|---|---|---|
| TC12-A01 | TCA-668LK | B1-FLR2 |
| TC12-B01 | TCB-66BLK | B1-FLR2 |
| IC01-A01 | ICA-66BLK- | B1-BSMT |
| IC01-B01 | ICB-66BLK- | B1-BSMT |
| J02101 | RJ11 | WA02101 |

Definition | Termination | Custom Fields | Note color: beige
brand:
rating:

| Defined Types | |
|---|---|
| Level | Type | Description |
| 1 | CAMPUS | Campus |
| 2 | BLDG | Building |
| 3 | FLOOR | Floor |
| 4 | ROOM | Room |
| 5 | CITY | City base of operation |

Definition | Custom Fields

Type: CITY
Default Level: Campus ▼
Description: City base of operation
ID Prefix: CT-
Graphic:

[Paste] [Copy] [Clear] [Load]

Figure 8

| Defined Types | |
|---|---|
| Type | Description |
| WA | Work Area |
| ROOM | Room |
| TC | Telecommunications Closet |
| ER | Equipment Room |
| HH | Handhole |
| MH | Manhole |
| POLE | Utility Pole |
| PB | Pull Box |

Definition | Custom Fields

Type [ROOM]

Description [Room]

ID Prefix [RM-]

Graphic

[Paste] [Copy] [Clear] [Load]

| Defined Types | |
|---|---|
| Type | Description |
| 300MM | 300MM Wire Tray |
| 50MM | 50MM Wire Tray |

Definition | Custom Fields

Type: 50MM
Description: 50MM Wire Tray
ID Prefix: WT -
Graphic:

[Paste] [Copy] [Clear] [Load]

| Defined Types | |
|---|---|
| Type | Description |
| 4PR | 4 Pr. - TIA-568 Unshielded |
| 25PR | 25 Pr. Horizontal Cable |
| 100PR | 100 Pr. 2nd level Backbon |
| 300PR | 300 Pr. 1st level Backbone |
| 500PR | 300 Pr. Interbuilding Back |
| LT | Line Trunk Cable |

Definition | Custom Fields

Type [4PR]

Description [4 Pr. - TIA-568 Unshielded Twisted P]

ID Prefix [C-]   # Positions [4] ▼

Manufacturer [Belden]

Cost [$0.00] Per Foot

Color [BLUE] Max. Length [90]

Graphic

[Paste] [Copy] [Clear] [Load]

Definition | Custom Fields

- Type: WP-6
- Description: Wall Plate with 6 positions
- ID Prefix: WP-
- # Positions: 6
- Position Type: JACK
- Manufacturer: Levitron
- Cost: $0.00

Defined Types

| Type | Description |
|---|---|
| 66BLK-12 | 66 Block with 12 positions |
| 66BLK-24 | 66 Block with 24 positions |
| 66BLK-48 | 66 Block with 48 positions |
| PBX | Telephone Switch |
| WP-6 | Wall Plate with 6 positions |
| WP-4 | Wall Plate with 4 positions |
| WP-2 | Wall Plate with 2 positions |
| WP-1 | Wall Plate with 1 position |

Figure 13

| Definition | Custom Fields | Note |

Level Type [CAMPUS ▼] Campus
Location ID [CMP-JACKSON]
Name [Jackson Central Campus]

Drawing Reference

Drawing #
[Jackson018895.dwg]  [Browse]

Entity ID
[                    43]  [View Drawing]

Figure 14

| Definition | Custom Fields | Misc | Note |

Space Type [WA ▼] Work Area
Space ID [WA01101]
Description [Work Area, Room 101]

Physical Location

Campus [MAIN ▼] Main Campus
Building [CANTON ▼] Canton Building
Floor [B1-FLR1 ▼] Floor 1, Canton Building
Room [B1-101 ▼] Room 101, Canton Building Unassign selected level

[<u>U</u>nassigned]

Figure 15

| Definition | Termination | Custom Fields | Note |

Type [RJ11 ▼] RJ11 Jack with 2 positions

Hardware ID [J01101]

Space ID [WA01101] [...]

Switch [ ] [...]

Installed [7/9/1998 10:17:28 AM] [...]

Position Counts

|  | Nrml. | Dmgd. | Rsrvd. |  |
|---|---|---|---|---|
|  |  |  |  | Valid Ckt ID |
| Survey |  |  |  | No Ckt ID |
|  | 0 | 0 | 0 | Total |

Drawing Reference

Drawing #

[ ] [Browse]

Entity ID

[ 0] [View Drawing]

Figure 16

| Defined Positions | | |
|---|---|---|
| Term.Pos. | Type | Term Hard. |
| S110-014 | SPLICE | S110 |
| S110-015 | SPLICE | S110 |
| MC01-A01-023 | STD | MC01-A01 |
| MC01-A01-024 | STD | MC01-A01 |
| MC01-A01-025 | STD | MC01-A01 |
| PBX1-001 | LEN | PBX1 |
| PBX1-002 | LEN | PBX1 |
| PBX1-003 | LEN | PBX1 |
| PBX1-004 | LEN | PBX1 |
| PBX1-005 | LEN | PBX1 |
| PBX1-006 | LEN | PBX1 |
| PBX1-007 | LEN | PBX1 |
| PBX1-009 | LEN | PBX1 |
| PBX1-011 | LEN | PBX1 |

Definition | Termination | Miscellaneous | Custom Fields | Note

Switch Port

Position Type [LEN ▼]    Term Hw [PBX1]

Position [7]

Position ID [PBX1-007]

User ID [0]

Circuit ID

Conductor Configuration

Switch [SWITCH1]

Port (LEN) [000004]

Figure 17

| Definition | Termination | Custom Fields | Cables | Note |

Path Type [50MM ▼] 50MM Wire Tray

Pathway ID [WATC-WA02201]

Condition [Ok ▼]

Present Fill [25] %    Max F. [70] %

Loading [20] lbs/ft    Max L. [45] lbs/ft

Length [75] feet    Bends [0]

Drawing Reference

Drawing #

[WA022.dwg]    [Browse]

Entity ID

[0]    [View Drawing]

Figure 18

| Definition | Termination | Custom Fields | Pathways | Note |

Type CL2P-CAT5-25 ▼ 25PR CAT5 Class 2 Plenum/Horiz

Cable ID C01101

Overall Length 30 Feet

UPC

Installed 7/9/1998 10:17:28 AM ...

*Position Counts*

| | Nrml. | Dmgd. | Unterm. | |
|---|---|---|---|---|
| | | | | Valid Ckt ID |
| Survey | | | | No Ckt ID |
| | 0 | 0 | 0 | Total |

---Drawing Reference---

Drawing #

WA022.dwg    Browse

Entity ID

0    View Drawing

Figure 19A

| Definition | Termination | Custom Fields | Pathways | Note |

| POS | STATUS | CONDITION | LENGTH | CIRCUIT10 |
|-----|--------|-----------|--------|-----------|
| 1 | Normal | Ok | 30 | X2000 |
| 2 | Normal | Ok | 30 | |
| 3 | Normal | Ok | 30 | |
| 4 | Normal | Ok | 30 | |
| 5 | Normal | Ok | 30 | |
| 6 | Normal | Ok | 30 | |
| 7 | Normal | Ok | 30 | |
| 8 | Normal | Ok | 30 | |
| 9 | Normal | Ok | 30 | |
| 10 | Normal | Ok | 30 | |

[Generate] [Remove]  [+] [—] [▲] [✓] [✗]

Pos: 1    Status: Normal
          Condition: Ok

|  | End1 | End2 |
|---|---|---|
| Space | WA01101 | B1-FLR1 |
| Termination | J01101-001 | TC11-A01-001 |

Length: 30    Circuit ID: X2000

Figure 19B

| Definition | Status | Charges | History | Trouble Log | Note |

Asset ID: D1T-2

Asset #: 70

Category: Refurbished DTERMS

SubCategory: DTERM Series 1

Description: DTERM Series 1

User: Hill, Missy  30819

Space: Work Area, Room 201

Cable...

Circuit:

Serial #: 0T110076912

Parts Warranty Ends: 10/8/1998

Labor Warranty Ends: 9/8/1998

Figure 20

| Definition | Status | Charges | History | Trouble Log | Note |

Status: To be installed ▼    Install Date: 7/24/98

Condition: Normal ▼    Remove Date:

Purchase Date: 6/1/98    Original Cost: $135.89

Custom Fields

Figure 21

| Definition | Status | Charges | History | Trouble Log | Notes |

| Charge # | Type | Billing ID | Quantity | Amount |
|---|---|---|---|---|
| ▶ 85003 | CP-4003 | 19120 | 1 | 171.20 |

Figure 22

| | Date/Time | Description | Note |
|---|---|---|---|
| ▶ | 1/21/98 10:23:32 AM | Added | |
| | 1/21/98 10:23:45 AM | On shelf | Scheduled for installation |
| | 1/21/98 10:23:45 AM | User changed | Associated with this item |
| | 1/21/98 10:23:58 AM | On shelf | Scheduled for installation |
| | 1/21/98 10:23:58 AM | User changed | Associated with this item |

Tabs: Definition | Status | Charges | History | Trouble Log | Notes

Cable Search Sequence Rule

Protocol Name [TEST]

When faced with a branch decision,

Hardware of type: [ICB]
Always connects to: [MCA]
Using: [Cable ▼]

In addition, restrict cable choices to only cables of this color.

[PURPAYELLO]

Precedence level: [73] (1 =highest priority)

---

Levels | Miscellaneous | Search Parameters

Defined Hardware Sequences

| Protocol | From | To |
|----------|------|-----|
| TEST | ICB | MCA |
| TEST | TCA | TCB |
| TEST | TCB | ICA |
| TEST | ICA | ICB |
| TEST | MCA | MCB |
| TEST | JACK | TCA |
| TEST | JACK | ICA |
| TEST | MCB | PBX |

Figure 27

Search | Connect |

Hardware

Jack ID [JACK]

PBX ID [PBX]

Positions

Count [1]

[Srch Existing]   [Srch New]

[Show Changes ...]

Figure 28

| Report type | What it does |
|---|---|
| Cable Detail | Lists all cables by ID then provides position information. |
| Cable User | Lists all users with circuits assigned and sorts by name then circuit ID. |
| Termination Hardware Summary | Lists all termination hardware by ID and provides information about each. |
| Cross Connect | Lists hardware positions that are cross connected to each other and the cables connected to the hardware on either side. Items are sorted by space or cable ID. |
| End-to-end Circuit | Lists all circuits by ID or user and all components included in the circuit. |
| Pathway Content | Lists each pathway by ID and their contents by cable ID. |
| Pathway Summary | Lists each pathway by ID and information about each. |
| Space Summary | Lists all spaces by ID and Information on each. |

Edit Report Schedule

| Status | Next Run | Report | Run Type |
|---|---|---|---|
| X | 09/30/98 06:00 pm | Area Code/Exchanges | One-Time, Specified Date/Time |
| X | 11/01/98 12:00 am | Accounting Call Detail | Recurring, Day of Month |
| | 11/30/98 06:00 pm | Call Summary By Extension | Recurring, Day of Month |
| | 11/30/98 12:00 am | Call Summary By Extension | Recurring, Day of Month |

Configuration | Print Location |

Schedule [Recurring, Day of Month ▼]    Report [Call Summary By Extension ▼]

Run Parameters

Start Date Criteria [Run Date minus ? Days ▼]   Day [30]

End Date Criteria [Use Date in Report ▼]

Recurring

Skip [0] Month(s) between runs

On [End of Month ▼]

☑ Repeat for only for specified period

Starting [11/1/98]  [12:00 AM]

Ending [11/1/99]  [12:00 AM]

[New] [Apply] [Remove] [Browse...] [Advanced View] [Refresh] [Close]

CABLE MANAGEMENT SYSTEM

FIELD OF THE INVENTION

This invention is directed to a telecommunications management system and more particularly to a graphics based, end-to-end cable path documentation and search tool system.

DESCRIPTION OF THE PRIOR ART

As telecommunication technology continues to march forward year after year, the telecommunications professional is faced with an ever increasingly complex task of dealing with systems constructed with ever increasing levels of complexity and detail. In the early days (circa 1982–85), a corporation's telecommunications infrastructure typically consisted of only a single phone system using a single Public Broadcast Exchange (PBX). When a new employee came aboard, maintenance on this telecommunications system was relatively simple—a few commands was all that was required to add a new phone.

However, as corporations grew, so did their telecommunications systems. Soon, companies had multiple telecommunications systems scattered among several sites. When an employee moved from one site to another, more commands were needed to accomplish this task—a "delete" on the old system and an "add" on the new system, and an accessible record indicating same. The tasks and their record keeping were at first dealt with manually using change requisition forms and control sheets.

For example, until recently, the only way to get reports on a corporation's phone activity was to wait for the bill from the phone company and then go through it manually, call entry by call entry. At some point in time, owners/operators of modern telecommunications systems realized they too could track phone activity by using special data ports in the PBX. These ports became known as Station Message Detail Records or SMDR. The concept was simple—every time a phone call was completed, the PBX would transmit a single SMDR data packet. These data packets could be collected, stored on a computer, and detailed reports could be generated. A new system known as Call Accounting was introduced to meet this requirement.[1]

[1]Please note that call accounting is on AIMWorX™ module.

However, while the Call Accounting system tracked phone use effectively, it also required data management. When a new employee came aboard, the telecommunications professional now had to add a data record into both the phone system and the Call Accounting system databases. When an employee moved, multiple records and multiple systems (e.g., databases) needed updating.

But technology did not stop there. Soon corporations began replacing individual telephone answering devices with more economical Voice Mail Systems (VMS). These systems could literally replace thousands of individual answering devices with a single machine. And VMS systems required data management means as well.

With the introduction of Computer-Based Phone Directories, Human Resource Systems, Credit Card/Authorization Code Systems, Emergency 911 Systems, Service Billing Systems, Network Access Devices, and many others, the telecommunications professional was soon faced with maintaining as many as 10 (or more) separate systems with the exact same information. Even with forms and procedures, this task was difficult at best and very error prone. Obviously, a better method was needed.

Another problem was that each of these systems have their own data entry terminal. This means that if the telecommunications professional does not use the integrated data management screen to do updates, the various databases in each system become out-of-sync with each other. This is known as the multiple-entry problem.

For example, suppose that a telecommunications professional updates the phone system via its own data entry terminal, but updates the Call Accounting and Phone Directory via the integrated data management screen. In this scenario, it is possible that the changes made directly to the PBX may be lost or be left different than those in the integrated product. The two databases are out-of-sync. Although it is tempting to mandate that all data entry is done via the integrated screen, in practice this is seldom the case. In many situations, work is required to be performed on a specific system and may require the use of a special field not accessible via the integrated screen. Even if all features could be moved to the integrated data management screen, the user interface would be so unwieldy that no user could navigate it.

The professional had to wait until the early 90's before solutions were attempted to address this problem. The first attempt at solving this problem was known as product integration. The concept was simple, a telecommunications vendor would produce a product that would combine all of the needed features into a single package. By having all of the telecommunication features in a single platform, software could be engineered to run the platform such that each feature would share a single database. Concomitantly, a single data management screen could be presented to the user. From this screen, all products could be updated at once. Soon, products began appearing on the market that were Call Accounting+Voice Mail+Phone Directory (or the like) all in one software package. North Coast Logic produced two generations of such packages (VSX and ARENIX). These packages worked in many environments and are still in use today.

However, they didn't work in all situations. One problem was that many corporations wanted multi-vendor solutions. The telecommunications professional did not want to be dependent on a single vendor for their entire communications infrastructure. They also wanted the option to shop around and get the best value, soon realizing that a single vendor could not be an expert in every industry.

Another problem was that these integrated software products typically consisted of or resided in a single hardware platform. That is, all applications ran on a single machine. If that machine failed, the entire infrastructure was brought down. Even though many vendors tried to compensate for this by using highly reliable (and redundant) equipment, the solution still fell short of relieving the mounting workload on the professional.

The problem with a single database design became evident by the database technology itself. No single database technology fills every application requirement. Each vendor makes database technology decisions based on their unique system framework. For example, a Call Accounting system may be able to use any off the shelf Database Management System (DBMS), but a Voice Mail System needs a specialized data streaming system that is able to store and retrieve recorded voice data at 4–8 kb per second. A Phone System database is usually completely stored in memory and made up of a series of jump tables organized in a tree-like fashion. This allows the system to traverse the database as each digit is dialed. No off the shelf database product would fit all of these unique requirements.

One suggested solution to this problem embodies a telecommunications software management system disclosed in copending U.S. patent application Ser. No. 09/183,414 for: A Telemanagement System With Modular Features And Database Synchronization, filed Oct. 30, 1998, (hereafter referred to as "the telemanager") and incorporated herein by reference. The telemanager is a server package which integrates a suite of system control and application modules used to manage one or more telephone systems.

The telemanager provides several significant functions. The first is that software or application modules are easily added to the telemanager to suit a company's growing telecommunication needs. Hence, as technology advances, modules may be added to the telemanager system in seamless integration with the PBX, the voice mail, and each existing, or future module added to the telemanager system. Second, the telemanager system easily synchronizes several databases, allowing them to operate as one, which proves beneficial for a number of reasons.

Also known is a "special"telemanager system which deploys a unique Single-Point-of-Entry and synchronous database system ("the SPE manager"). The SPE manager, like telemanager, is an integrated suite of system control and application software modules used to manage one or more telephone systems. The SPE manager is disclosed in commonly owned U.S. patent application Ser. No. 09/183,407, for: TELEMANAGEMENT SYSTEM WITH SINGLE POINT OF ENTRY, filed Oct. 30, 1998, and incorporated by reference herein.

The SPE manager controls commonly used PBX systems, and may also control adjunct systems such as voice mail and 911 emergency systems. The SPE manager may also integrate its application modules and system control modules through a single point of entry and provide for a synchronized database. Information entered through one module is thereby automatically accessible by all other modules (operating as a telemanager). For that matter, modules included to carry out particular telecommunications related tasks may be added to or deleted from the SPE manager based on user need.

The present invention is a telecommunications system software control module, that is, the cable manager module, used to define a telecommunications system as a graphical representation, and then apply a mathematical algorithm to the graphical representation to determine the shortest paths between components in the system. The graphical representation consists of points and line segments connecting the points, representing physical components of the system. The points represent the spaces in the system while the line segments represent the cables (or cable spaces) connecting the spaces in the system. A generic computer algorithm for determining the shortest distance between two points calculates same.

While the cable manager described herein is constructed to operate as a stand-alone module for integration into any conventional telecommunications system control software, it will be described herein with respect to its preferred embodiment as an active part of the AIMWorX™ telemanager or SPE manager suites. That is, the embodiment(s) disclosed herein are for exemplary purposes only and are not meant to limit the scope of the invention in any way.

Cable manager operates as a graphics based, end-to-end cable path documentation search tool constructed to interact within a software system environment, for example, the SPE system or telemanager. Once operational, cable manager manages all of the cables and connections comprising a telecommunication system.

BRIEF DESCRIPTION OF THE DRAWINGS

FIG. 4 is a screen used for selecting records by type;

FIG. 5 is a "select records" screen which allows a user to choose database records he/she wishes to view by type;

FIG. 6 is a list of TIA 606 standard identifiers which may be used with cable manager module of this invention;

FIG. 7A is a screen highlighting the cable manager's ability to allow a user to add custom fields to each component type defined:

FIG. 7B is a screen with highlighting cable manager's ability to record values for custom fields;

FIG. 8 is a screen which provides a user with an ability do define location types;

FIG. 9 is a screen which provides a user with an ability to define space types;

FIG. 10 is a screen which provides a user with an ability to define pathway types;

FIG. 11 is a screen which provide a user the ability to define cable types;

FIG. 12 is a screen which provides a user the ability to define termination hardware types;

FIG. 13 is a screen which provides a user the ability to define termination position types;

FIG. 14 is a screen which provides a user the ability to enter locations and group spaces based on level structure;

FIG. 15 is a screen which provides a user the ability to enter spaces into the cable manager database and group spaces based on physical (levels) structure;

FIG. 16 is a screen which provides a user the ability to enter termination hardware into the cable manager database;

FIG. 17 is a screen which provides a user with the ability to enter termination positions into the cable manager database;

FIG. 18 is a screen which provides a user the ability to enter pathways;

FIG. 19A is a screen which provides a user the ability to enter cables;

FIG. 19B is a screen which provides a user the ability to enter custom cable positions;

FIG. 20 is a screen which provides a user the ability to enter equipment/assets;

FIG. 21 is a screen which allows a user to enter an assets status;

FIG. 22 is a screen which provides a user the ability to enter a charges tab;

FIG. 23 is a screen which provides a user the ability to enter a history tab;

FIG. 24 is a screen which provides a user the ability to enter circuits;

FIG. 27 is a screen which provides a user the ability to enter define search rules;

FIG. 28 is a screen which provides a user the ability to enter define start and end points during a cable path search;

FIG. 33 is an example of various report types available from cable manager;

FIG. 34 is a screen depicting a menu available for a user to run a report using the cable manager;

FIG. 35 is a screen which provides a user the ability to schedule a particular report on cable manager;

DETAILED DESCRIPTION OF THE INVENTION

A first embodiment of this invention comprises a cable management system, referred to herein as cable manager. Cable manager is a software module comprising a set of computer instructions which provide for searching and tracking telecommunication paths within a documented telecommunication system. More particularly, cable manager is a graphics based, end-to-end cable path documentation search tool which is designed to realize the most efficient way to use the structure of an existing telecommunications cable system to which it is applied. Cable manager may be utilized as a stand-alone system, or as a module for integration within the AIMWorX™ telemanager or SPE manager, the preferred embodiment herein.

Cable manager is often called upon to search for the shortest path of cable (one that contains the least number of cross-connects) that runs between two given points (e.g., a telephone jack and the PBX) in a telecommunications system in an effort to optimize cost according to a set of particular operating rules. Cable Manager automates the entire search process once the telecommunications is defined and memory-stored according to cable manager protocol.

The graphical representation generated by the cable manager is essentially a telecommunications cable plan. Cable manager controls and manipulates the plan, e.g., search, according to the protocol. A key cable manager feature is its ability to determine the shortest path between two user- or program-designed points within the system by implementing a generic computer algorithm.

At the Network level, the cable manager database resides on a computer server with the other AIMWorX™ database files or modules[2]. In the preferred embodiment, the modules communicate through the server using a TCP/IP network protocol on Windows 95 or Windows NT computers. Several other modules needed to operate

[2]Alternatively, cable manager may be interfaced with any generic telecommunications manager and conduct its intended tasks. cable manager in a preferred embodiment will now be described.

One is "License Server", a security program which interacts with the security key on the parallel port and the application on each client server: License server regulates which modules and instances of each which may be used on a license purchased by a client for AIMWorX™ software. License server runs on a server computer and has an icon of a safe in the system tray.

The present embodiment also requires Cable Manager access to Oracle Personal 7 and Oracle Server for Workgroups for database management. AIMWorX™ telemanager (or SPE manager) loads one of these versions during installation. When it is launched on the server computer, it runs continuously while any AIMWorX™ module is in operation. The Cable Manager in this form also includes Adobe Acrobat Reader 3.0 to allow a client to view and print online manuals from the help menu. Reader includes outlining, zoom, search features, and cut and paste capabilities.

Figure 1:
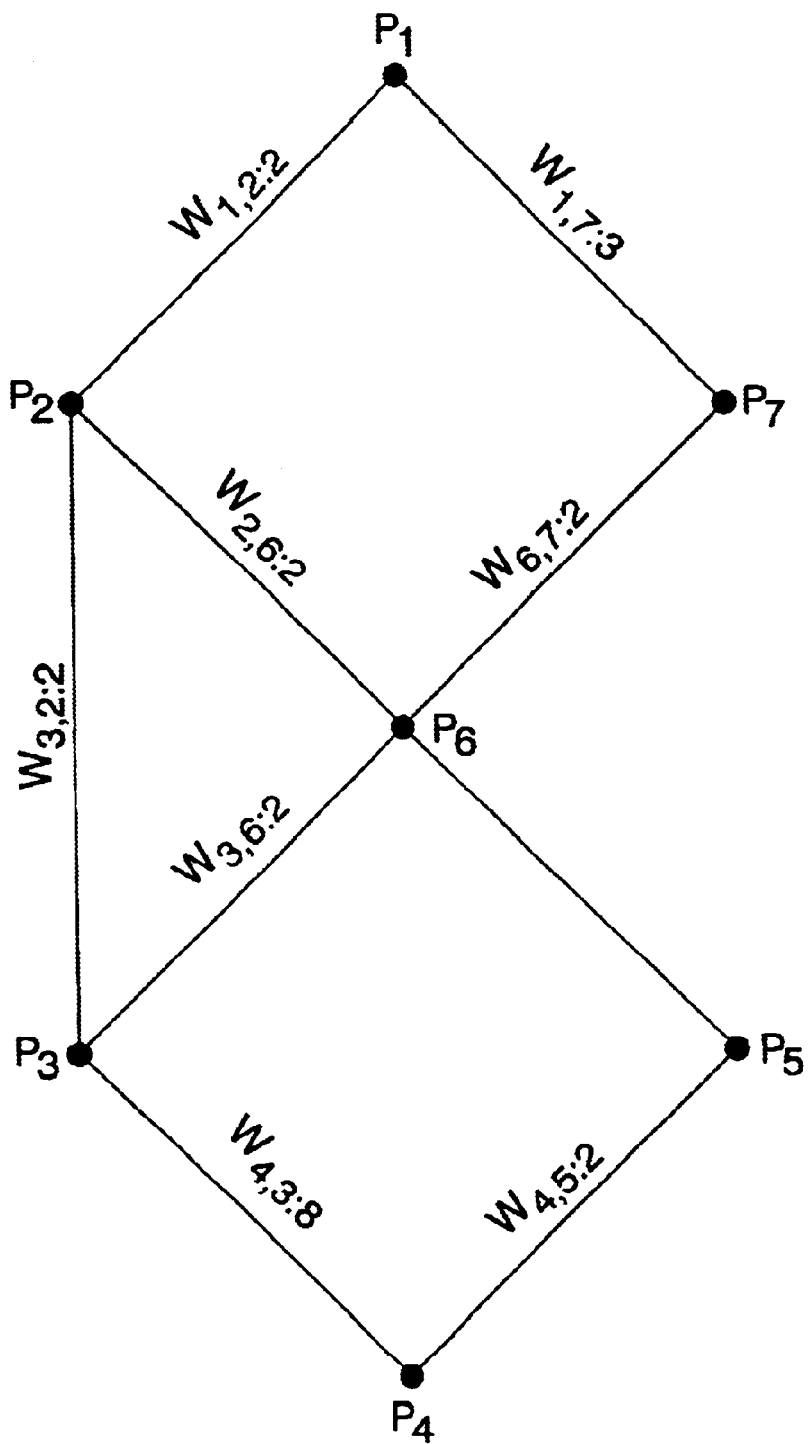
FIG. 1 is a cable plan comprising a graphical representation utilized by the invention.

A cable plan, or graphical representation of the communications system, in its simplest form consists of spaces, hardware residing within the spaces and pathways interconnecting cables and cross-connects. The telecommunications system is represented thereby as an abstract graph defined as a finite set of points some of which are connected by line segments. FIG. 1 shows a non-directional weighted graph representative of the present invention. Points are the vertices of the graph, which represent spaces. Line segments are the edges of the graph, which represent cables or pathways, and the lengths of the cables which run between spaces are defined numerically and attached as weights or coefficients to the edges.

Several benefits derived from the use of cable manager include cost reduction for moves, adds and changes, faster responses to trouble reports, an improved level of service, a fuller use of existing capacity, including recovery of unused capacity and speed disaster recovery. The cable manager module keeps track of the entire telecommunication cable system via the graph. It tracks how much capacity it used relative to what capacity is available for use. It provides a user the ability to assign each termination point, cable, space and circuit a custom identification label.

Cable manager lets a user create and organize telecommunication components and multiple level views of the cabling system or graph. Once all points and pathways are labeled and stored within the cable manager database, cable manager provides a user with an ability to review the full facility as a series of termination-cable-termination segments, and join the segments with cross-connects to create a jack-to-switch circuits.

Once data are input into cable manager and a graphical representation of the telecommunication system is in place, a generic algorithm is utilized by the Cable Manager to search for and determine the shortest path running between two given points. DIJKSTRA's shortest path algorithm is utilized in the preferred embodiment, but other shortest path algorithms may be used in place of DIJKSTRA without diverting from the scope and spirit of the invention.

Cable Manager operation also may require particular hardware, at a minimum a phone switch, a computer and a network. The phone switch for the preferred embodiment includes a NEC NEAX 2400, IMS HDS, or IMS or a NEAX 2000 IVS. The switch provides the phone services and acts as the source of the SMDR. The particular computer utilized as the server may be any computer readily determined by one skilled in the art to be capable of implementing the module of this invention.

In its preferred form (operating as part of an AIMWorX™ suite), cable manage must be configured in two different system setups. The first is from within AIMWorX™ telemanager or SPE manager servers. This provides a user with a screen interface for effecting communications between telemanager and cable manager. The other is a particular cable manager operational mode by which its maintenance menus a user is able to set up default parameter for use by the program.

Figure 2A:
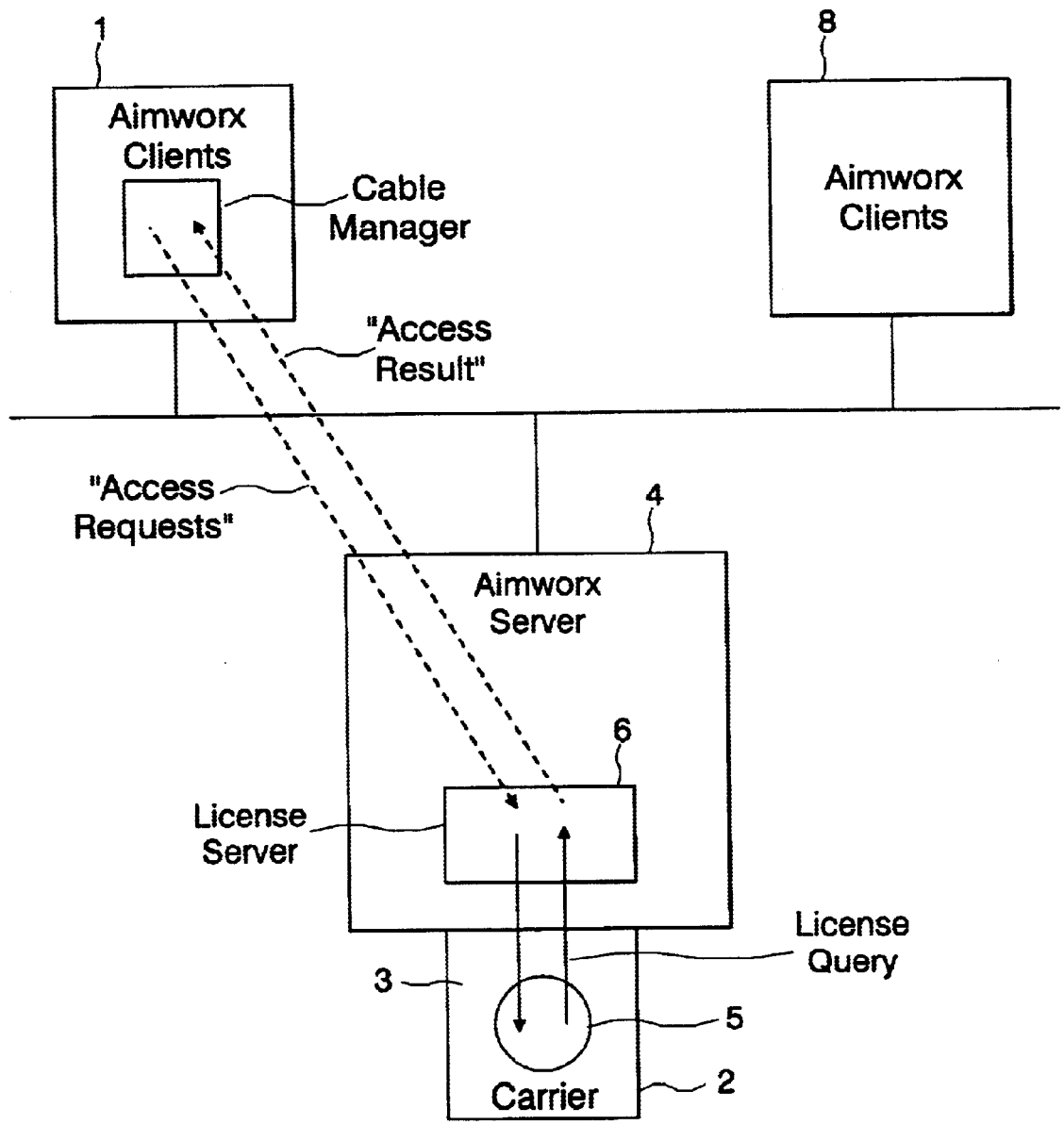
FIG. 2A is a schematic diagram which highlights the security arrangement by which an AIMWorX™ software product of this invention may be protected.

In the preferred form of FIG. 2A, cable manager 1 may provide a tab on the users screen to link a specific circuit to a user. Accordingly, cable manager is required to operate in conjunction with a security key 2 and a hardware component loaded onto the computer/server 4. The security key 2 has the appearance of a port adaptor, including two parts; the button 5 and the carrier. The carrier 3 holds the button 5 and plugs into the parallel port 6 of the server computer, into which a printer may be plugged on the other side if necessary. The button is programmable and provides access to other modules within the AIMWorX™ system or SPE manager.

Figure 2B:
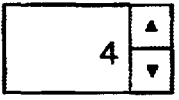
FIG. 2B is a screen associated with a maintenance and system setup screen provided by the present invention.
Figure 3:
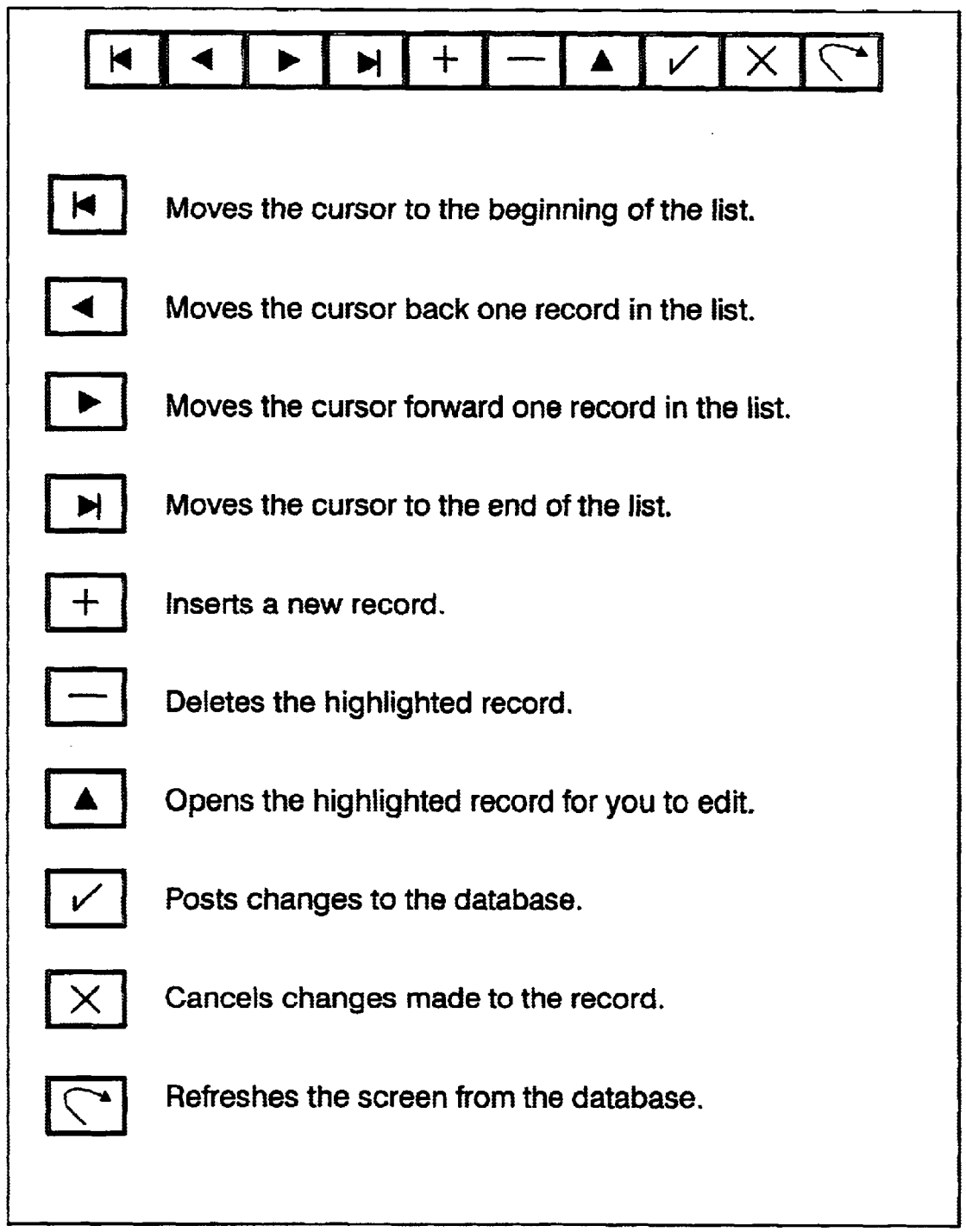
FIG. 3 is a depiction of the buttons for navigating through, adding, deleting and editing information in the cable manager database.

The first step in using cable manager (whether as an integrated AIMWorX™ package or stand-alone) is to define defaults in the cable manager system setup process. The telecommunications cable system must be divided into a number of levels, such as campus, building, floor, section, and room, as can be seen on the screen of FIG. 2B. The search parameters tab provides a user the ability to set up rules that the search routine will use to decide circuit paths. And because cable manager database can be huge, causing long lists of users, assets or cables, navigator buttons are included for standard methods of navigating and searching a database, as shown in FIG. 3. It should be noted that cable manager provides a select records function which allows a user to select from lists of records displayed on a screen, using the screens shown in FIGS. 4 and 5.

Before using cable manager a user must make decisions with respect to component numbering and naming schemes of telecommunications system components, label and survey the existing system equipment, define system component types, connect cables and hardware, trace existing circuits and cause each to be stamped with a circuit ID. This is accomplished by providing a user with the particular protocol definitions for accomplishing same using screens shown in the various drawing figures attached hereto.

It should be noted that Cable Manager uses terminology that is well known to those in direct contact with communications cabling. For example, locations, spaces, pathways, cables, termination hardware, termination positions, cross connects and circuits. And system ID numbers are defined as TIA 606 standard identifiers, or may be identified by a proprietary encoded numbering system.

Identifiers for database entry of particular system components may be selected from a pre-defined list shown at FIG. 6. Identifiers may also be custom defined by a user, as can be seen by viewing the screens of FIGS. 7 and 7B.

Each time a new component is entered into the cable manager database, its type must be selected from a pre-defined list. By creating a type list, a user defines parameters which are true for all components of the particular type. For example, a location type such as a city or a room may be defined by a user as shown in the screens of FIGS. 8 and 9. Cable manager also includes a custom's field feature which allows a user to add extra fields to each component type defined.

Cable manager allows a user to define types of spaces such as rooms, parts of a room, e.g., a wall or a place not even in a building like a pole, a man-hole, a hand hole, etc. Any place that can hold termination hardware may be defined as a space. Any pathways may be a conduit, cable tray or just an are of the ceiling in which a cable runs through, and user defined as available in the screen shown in FIG. 10.

Locations are defined as a collection of spaces which are used on the graphic view in Cable Manager (in the graph) to provide a client with a visual idea of the overall layout of the telecommunication cabling architecture of its system. Locations are connected to each other on the graphic with pathways.

Spaces are defined as the telecommunication architecture. Each space includes an ID number, a type and a description, contains termination hardware and are linked by pathways.

Pathways contain and are interpreted as operating essentially as cables. Anytime a cable leaves a space, it must travel in a pathway. Pathways may also be defined by the system user to take the form of a conduit, cable tray, or just an area of the ceiling that the cable runs through. Each pathway must be labeled and identified with an ID number, as can be seen by the screen of FIG. 18.

Cables are defined by cable manager to run between and within spaces. Ends of the individual wires comprising a cable are assigned to and physically connected to termination positions, also labeled and identified with an ID number. Cables range in size from a single twisted pair of conductors to hundreds of pairs in a twelve inch diameter insulated cable. Cable types may be defined by a user utilizing the cable manager screen shown in FIGS. 11, 19A and 19B.

Termination hardware (usually contained in spaces) is defined herein a typically comprising terminal blocks for punch down wires, although it could also be used to describe distribution hubs or wall plates for multiple phone jacks. Termination hardware always contains one or more termination positions, and is of course labeled and identified with a system ID number. A user's ability to define termination hardware is highlighted by the pop up screen shown in FIGS. 12 and 16.

Figure 13:
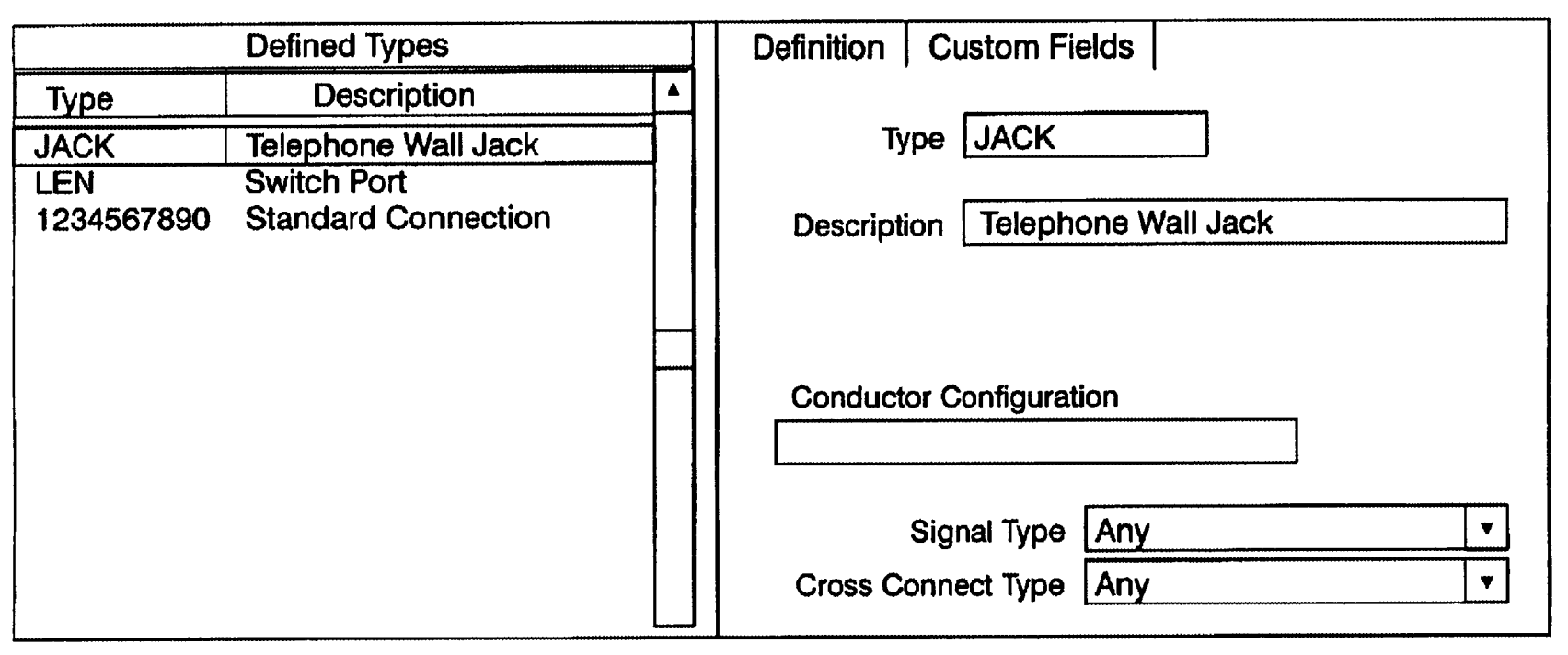

A termination position is defined herein as the exact point at which a wire connects to another wire. This usually takes place on termination hardware, although termination positions may exist without termination hardware, as in phone jacks. Termination position on terminal blocks are connected to corresponding termination positions on other terminal blocks with cross connects, and is of course labeled and identified with a system ID number. A user's ability to define termination position types using cable manager is highlighted by the screen shown in FIGS. 13 and 17.

Cross connects are wires connecting one termination position to another within the same space. These wires are not visablly identified, but only a record of each ends termination position are recorded, and are of course labeled and identified with a system ID number. Circuits are defined herein as records of the electrical path from a jack to a switch, as shown in a graph. The record starts at the jack and includes all hardware, positions, and cables that make the final connection to the switch. The circuit is given a unique identifier and can be given a description and assigned to a particular user.

Once the components are surveyed and provided with unique identification numbers and labels, and the type categories within which each will reside are created, each component must be entered into the database. For example, locations must be entered. The screen of FIG. 14 is a screen which highlights a procedure used by a user such that each time a space is created, it is assigned to a created location. Thereafter, all spaces must be entered by a user, as highlighted in the cable manager screen of FIG. 15.

Cable manager also provides for a user to include equipment/assets, which are entered in accord with a screen shown in FIG. 20, and status tabs, which are entered (defined) by a user as shown in the screen of FIG. 21, charge tabs for allowing a user to see past and current telecommunication system changes, a screen allowing client access to same shown in FIG. 22, a history tab to provide a client with a record or report of all transactions or occurrences via a screen shown in FIG. 23. Circuit identifiers may be created, moved and numbered by a user through the use of cable manager's screen shown in FIG. 24.

Figure 25:
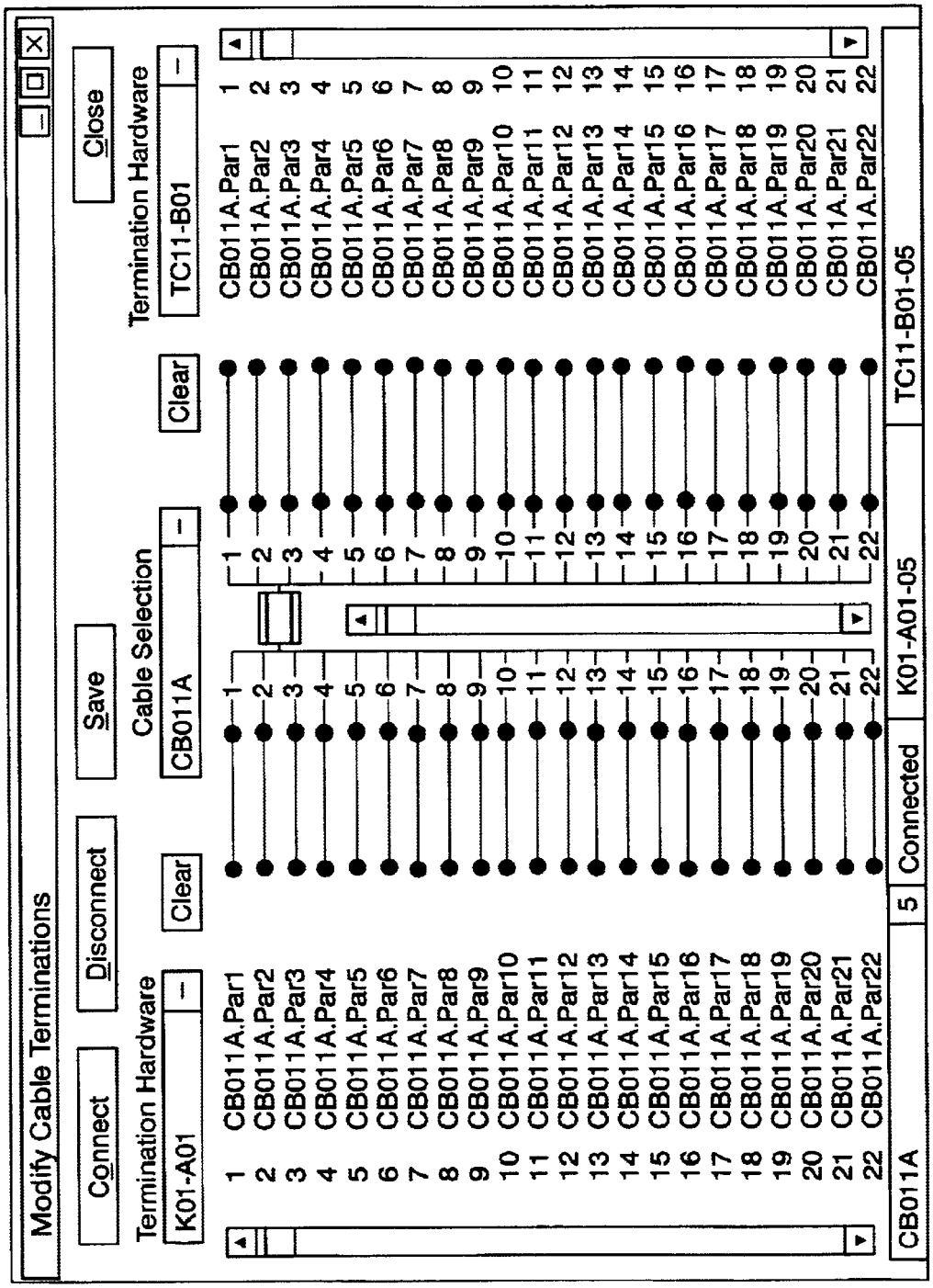
FIG. 25 is a screen which provides a user the ability to graphically connect and document cable positions.
Figure 26:
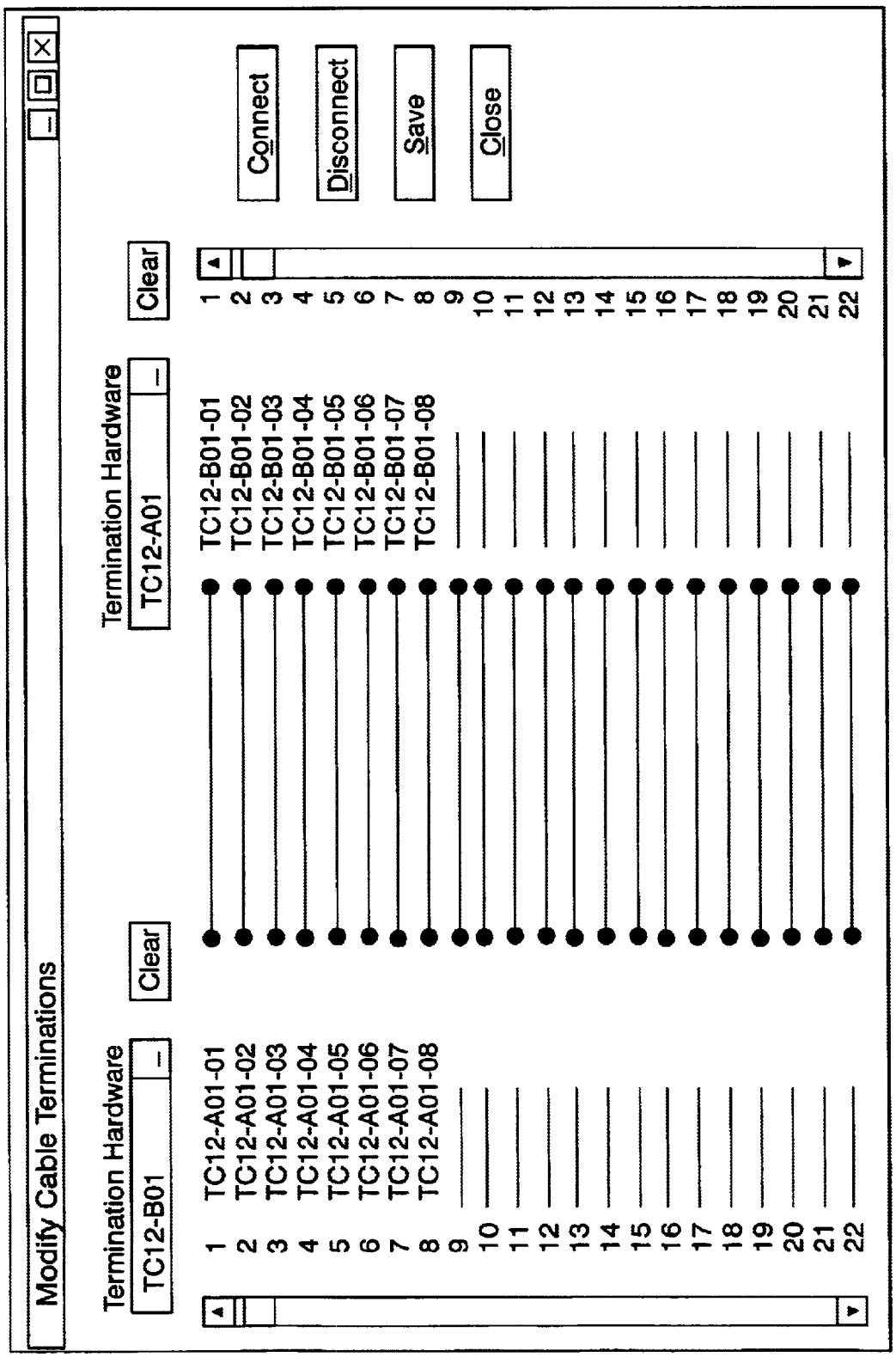
FIG. 26 is a screen which provides a user the ability to enter connect/disconnect cable positions.

Once all the components are defined in the AIMWorX's database, they must be connected. FIG. 25 shows a screen by which cable manager communicate the telecommunication system's interconnections. As can be seen in the figure, cable positions may be terminated to a hardware position that is already terminated to a different cable. More than one cable position may be terminated to the same hardware position. Cross connects connect termination hardware positions to each other. A user may view system cross-connects utilizing the screen shown in FIG. 26. Cross-connects may be from "piece to piece" or within the same piece of hardware as jumps.

Figure 29:
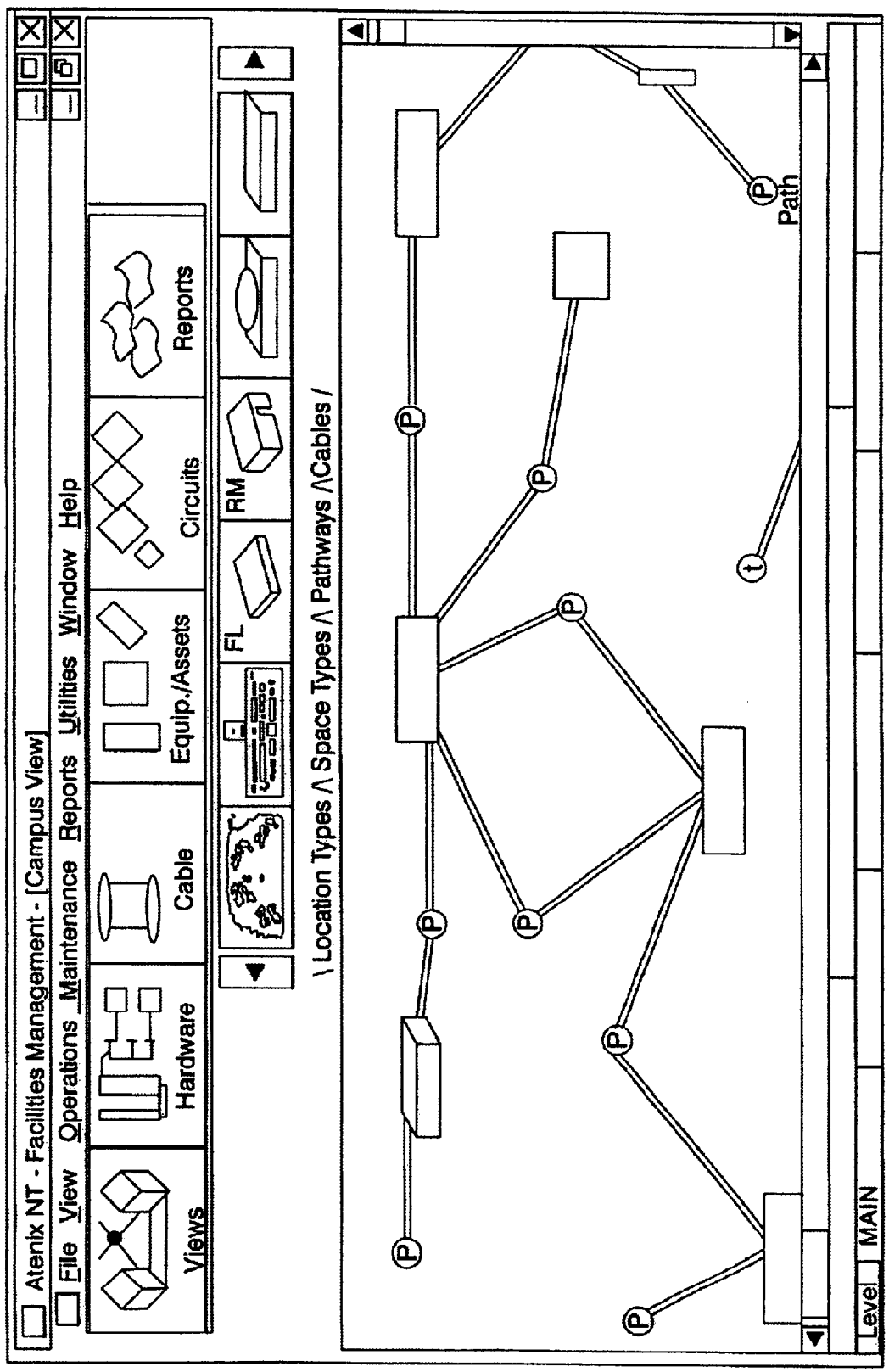
FIG. 29 is a screen which provides a user the ability to enter views.

Search path is a cable manager function which allows a the user to document existing circuits or add new circuits to existing installations. Search path is also responsible for providing the user the ability to select the shortest or the most efficient path between jack and switch to create a new circuit. FIGS. 27–28 show various screens which are available to allow a user to search for particular system parameters, and FIG. 29 shows a menu which provides a user the ability to select start and end points, and view a graphical representation of same. For that matter, cable manager may also search for path based on defined starting and end points. Not only are cable path views available, but cable manager also provides a user with an ability to create views of particular rooms, floors, buildings and campuses, as seen by the screen of FIG. 29.

Figure 24:
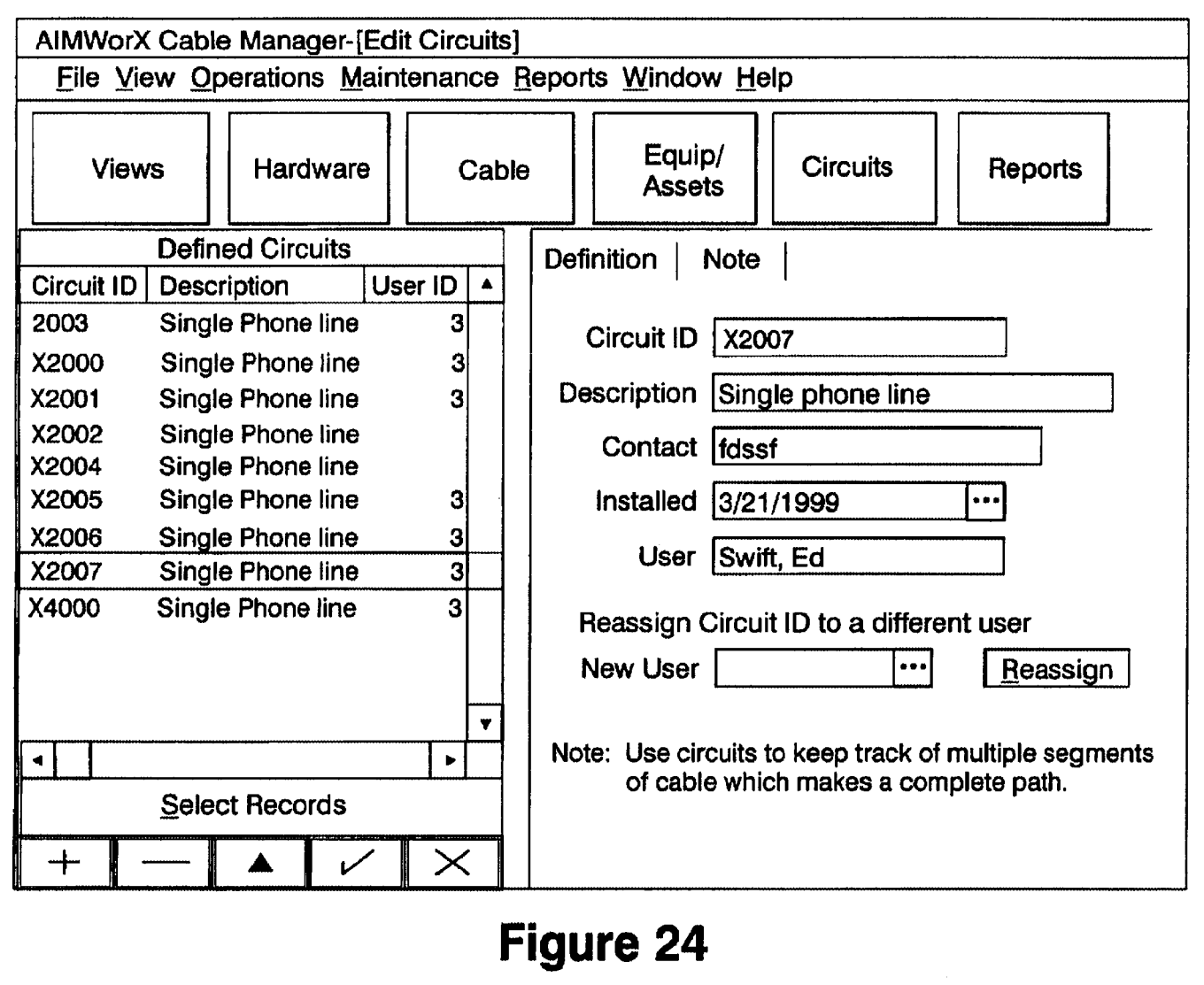
Figure 30A:
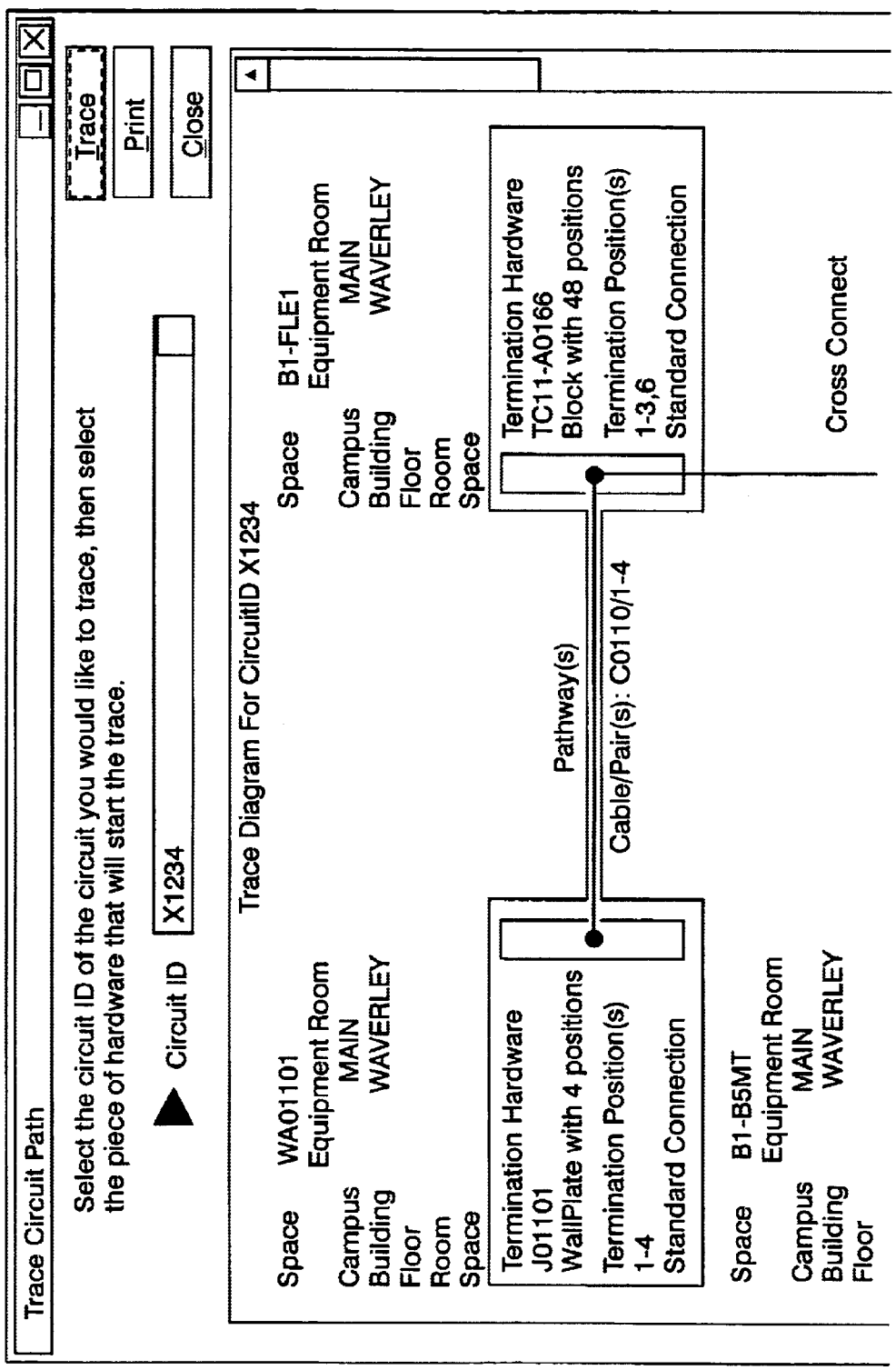
FIGS. 30A and 30B together are a screen that provides a user the ability to trace a circuit.
Figure 30B:
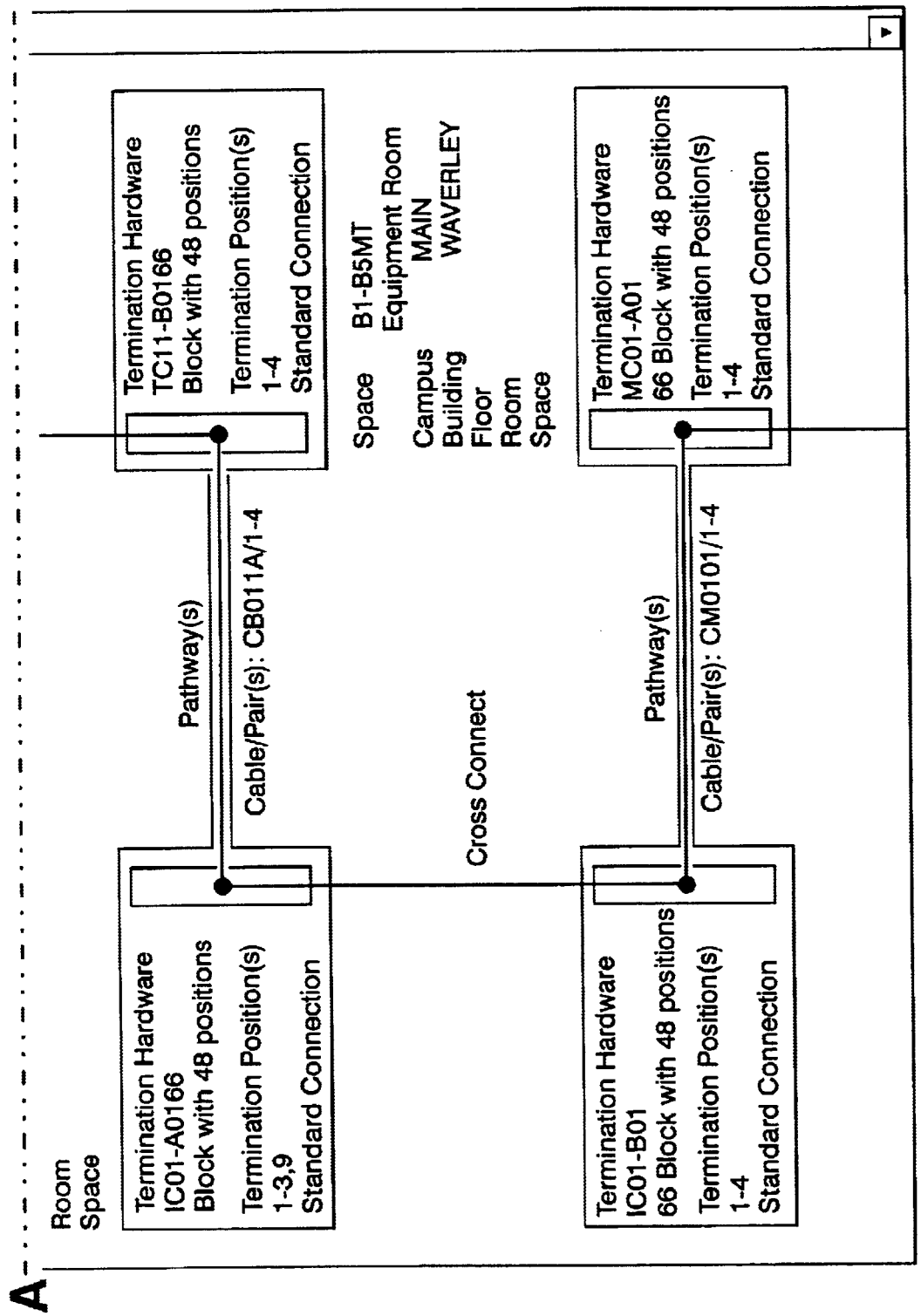
Figure 31A:
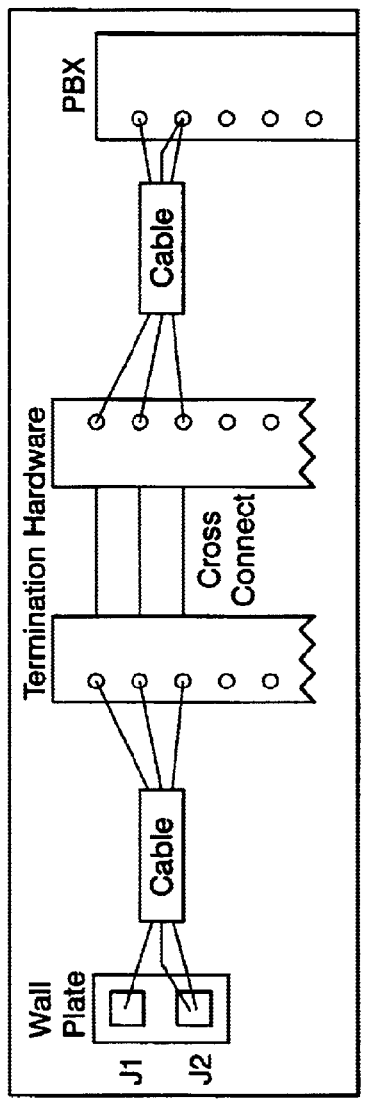
FIG. 31A is a schematic diagram depicting jacks using more than one cable pair.
Figure 31B:
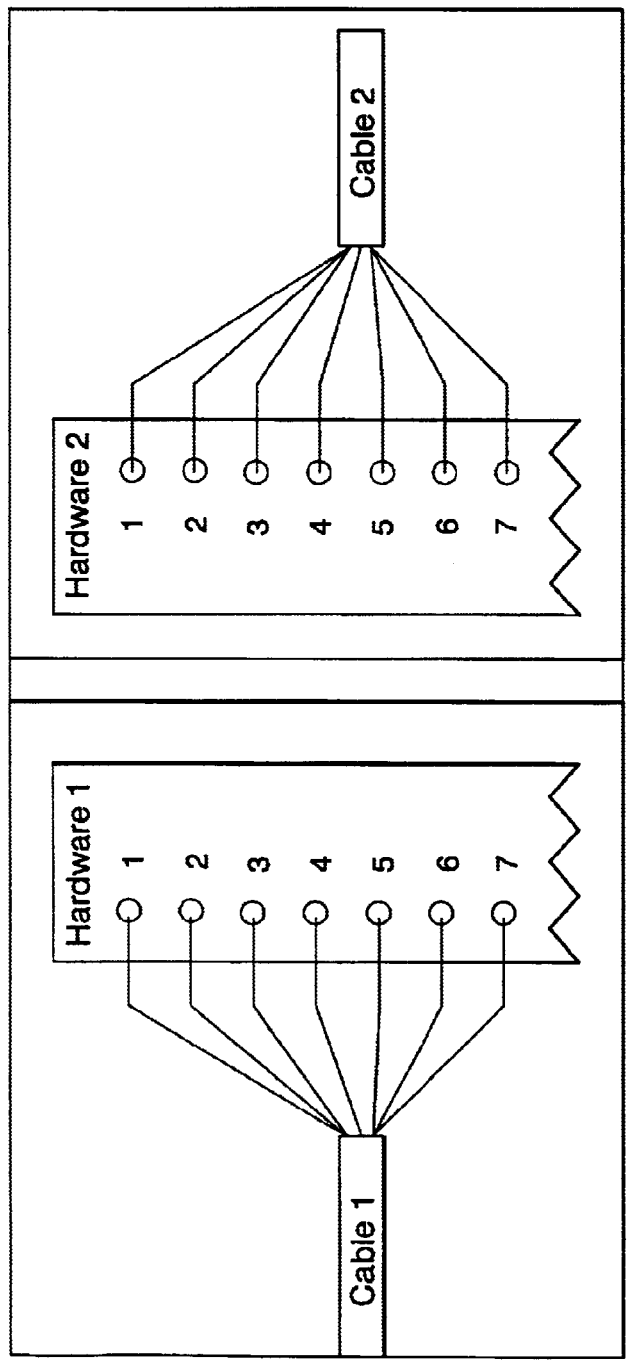
FIG. 31B is a schematic diagram depicting cable splices.
Figure 32:
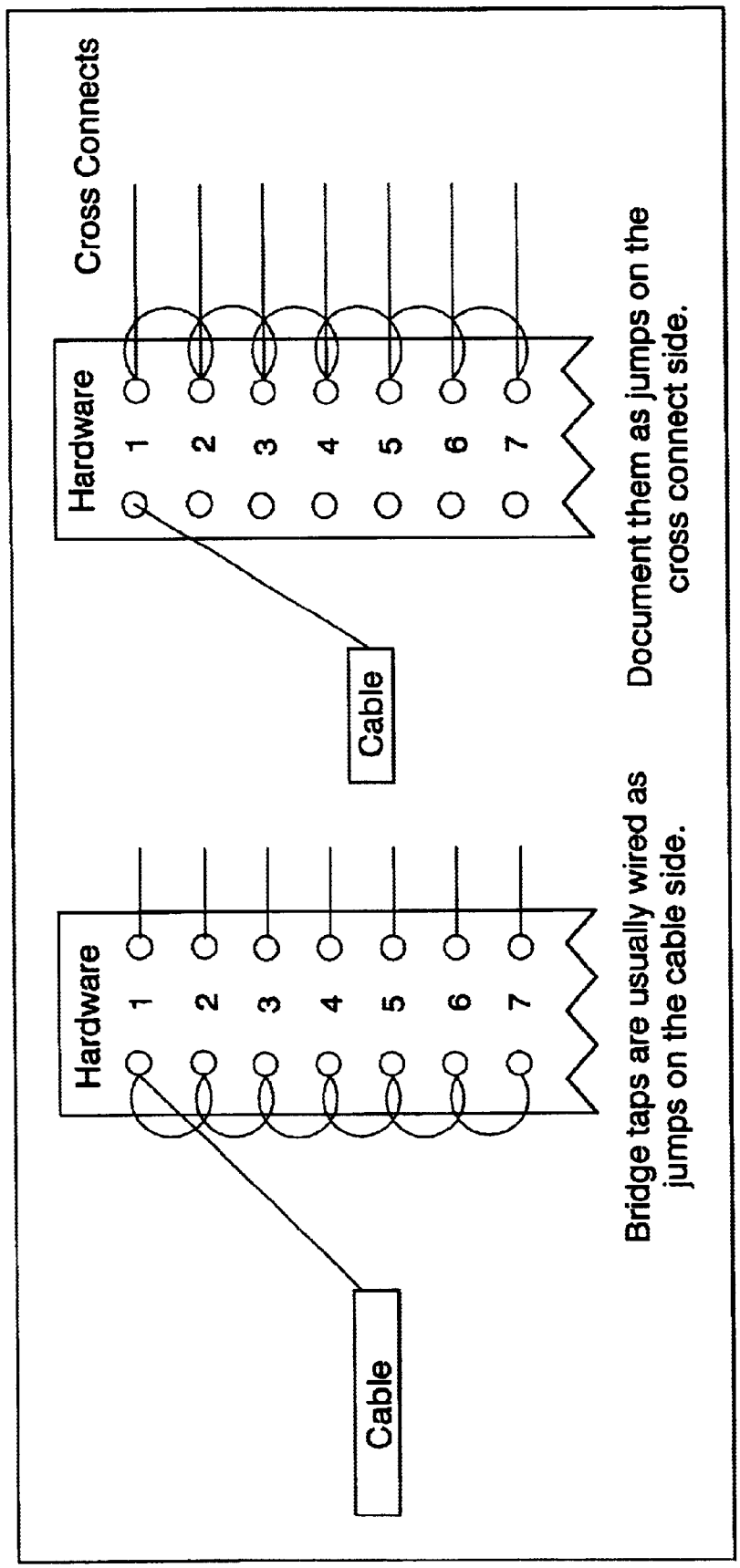
FIG. 32 is a schematic diagram depicting bridge taps.
Figure 34:
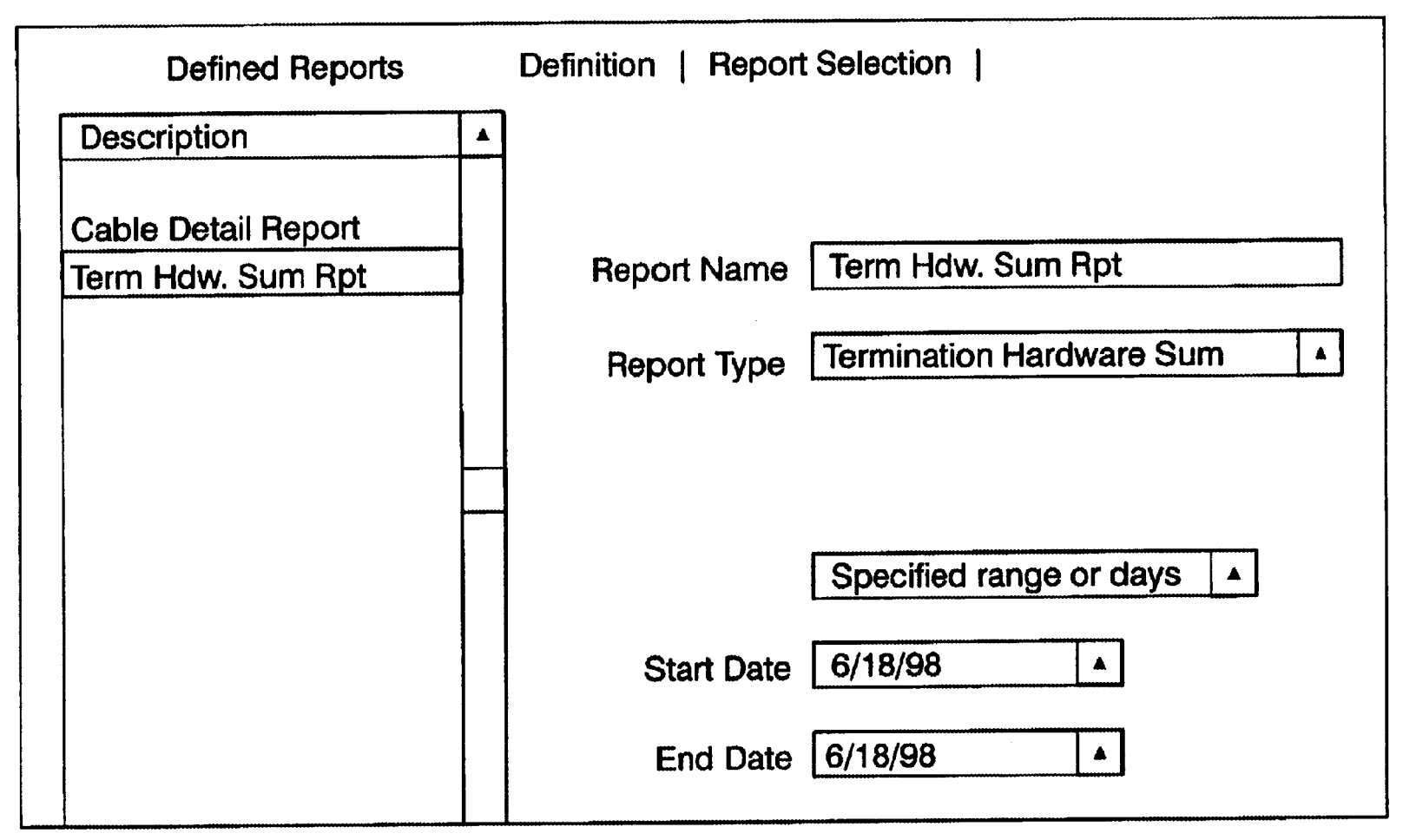

Cable Manager also provides for tracing a circuit and providing a view of same to a user to allow the user to see the components comprising same, as seen in the exemplary trace diagram of FIGS. 30A and 30B. As mentioned, FIG. 24 shows a screen which allows a user to render a circuit description, and FIGS. 31A and 31B together highlight cable manager's ability to allow a user to documenting special termination hardware cases and bridge taps FIG. 32. Cable manager also allows a user to generate reports to allow a user to see in print form the information that the Cable Manager has gathered. Reports may be customized or predefined by the Cable Manager by type, examples of which may be seen in FIG. 33. Reports are then run or scheduled to be run at a later time, as can be seen by viewing the screens of FIGS. 34 and 35.

Figure 36A:
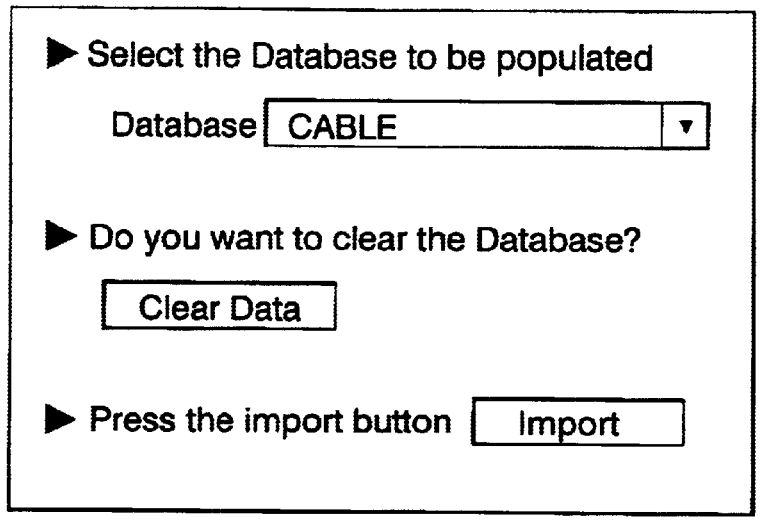
FIGS. 36A, 36B and 36C screens highlighting available user ability to import data into the cable manager database.
Figure 36B:
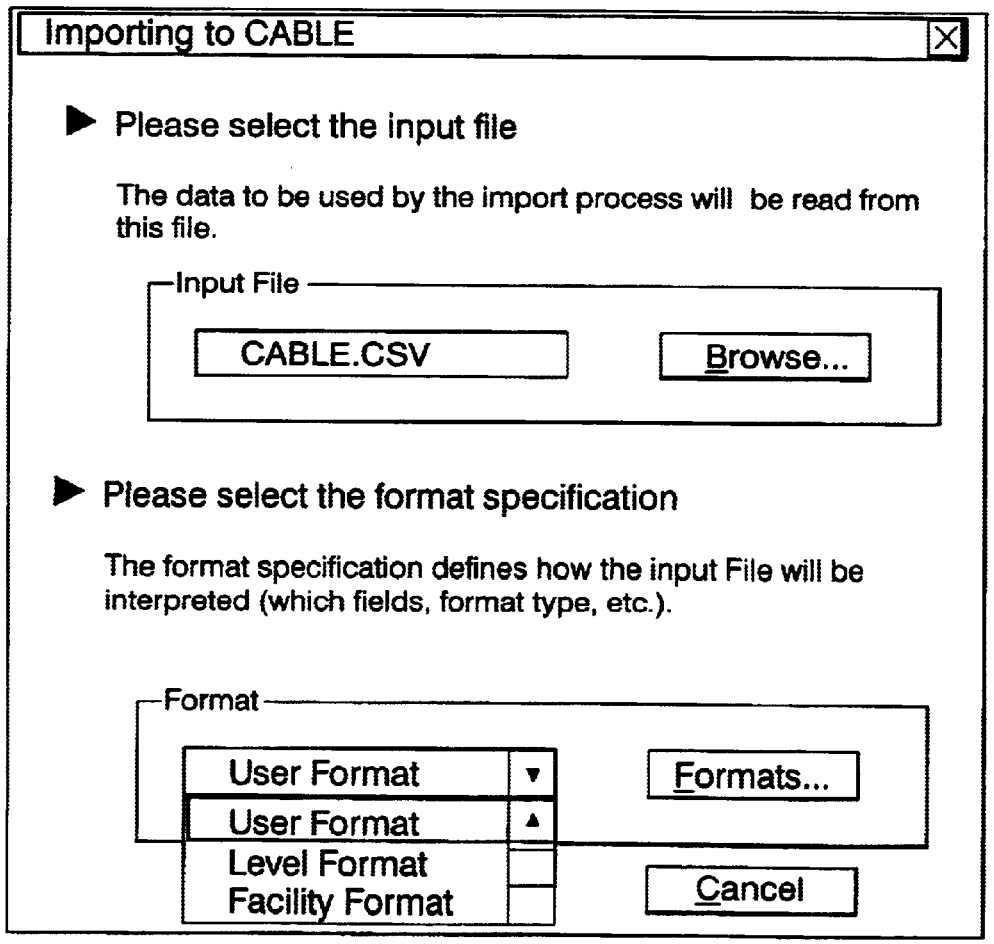
Figure 36C:
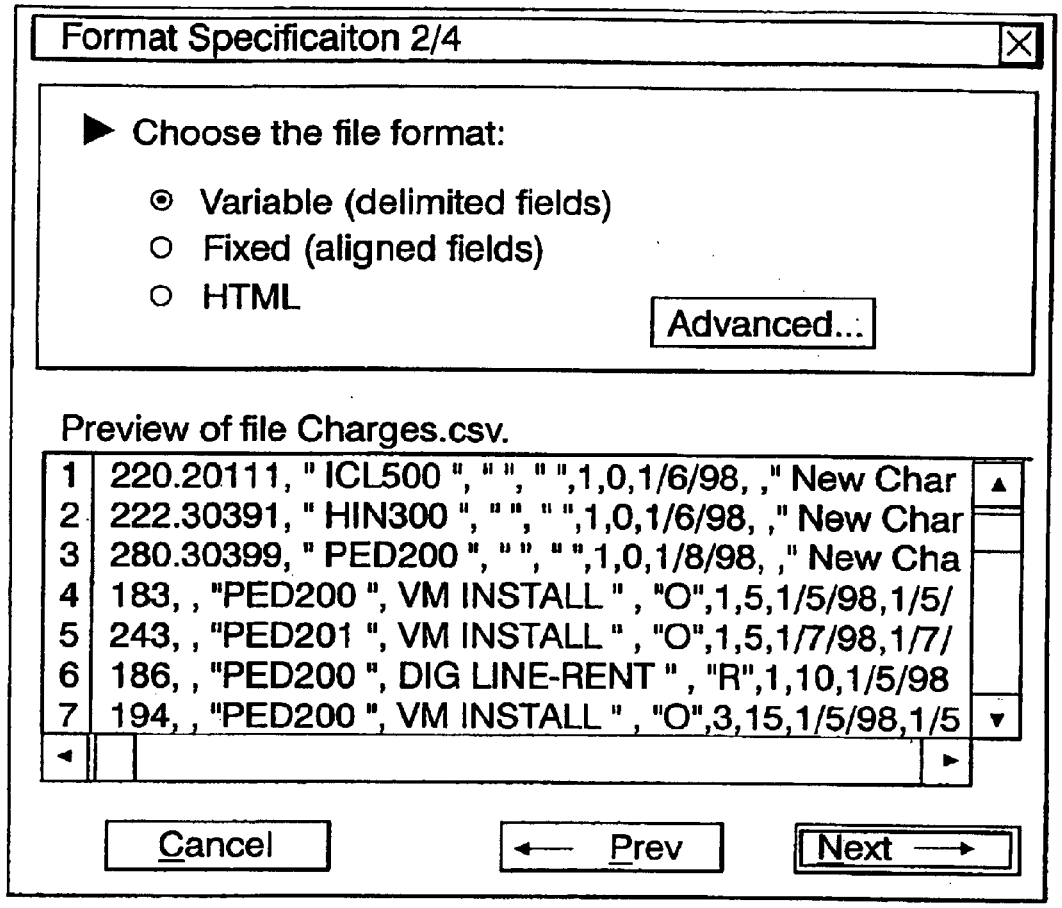
Figure 37:
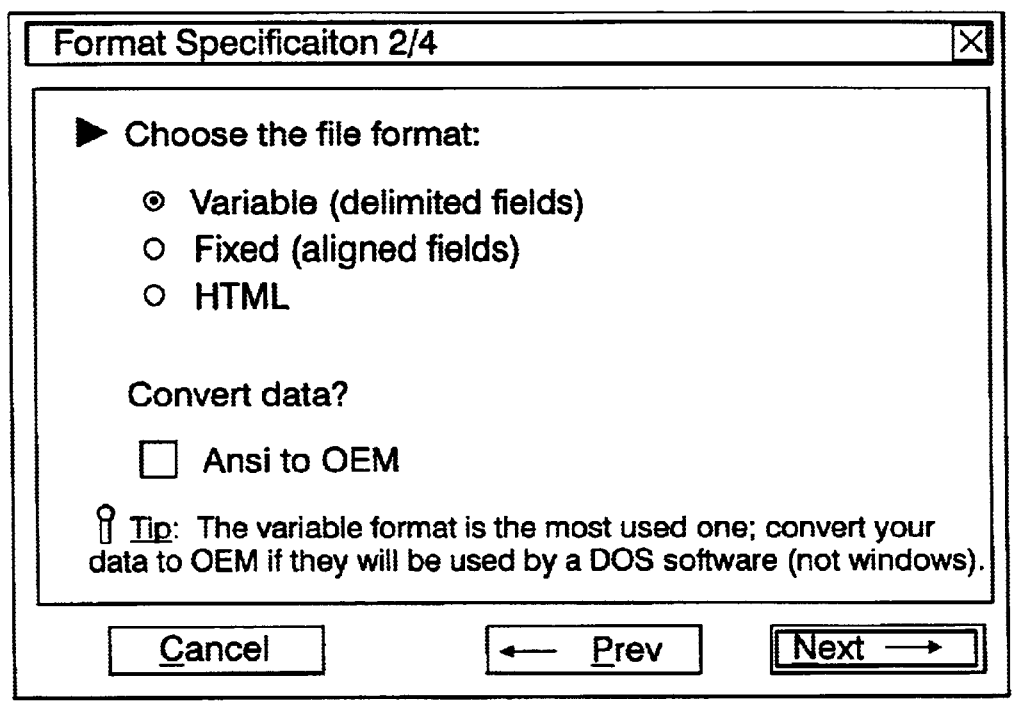
FIGS. 37, 37A, 37B and 37C are screens which together highlight a users ability to export data from the cable manager database.
Figure 37A:
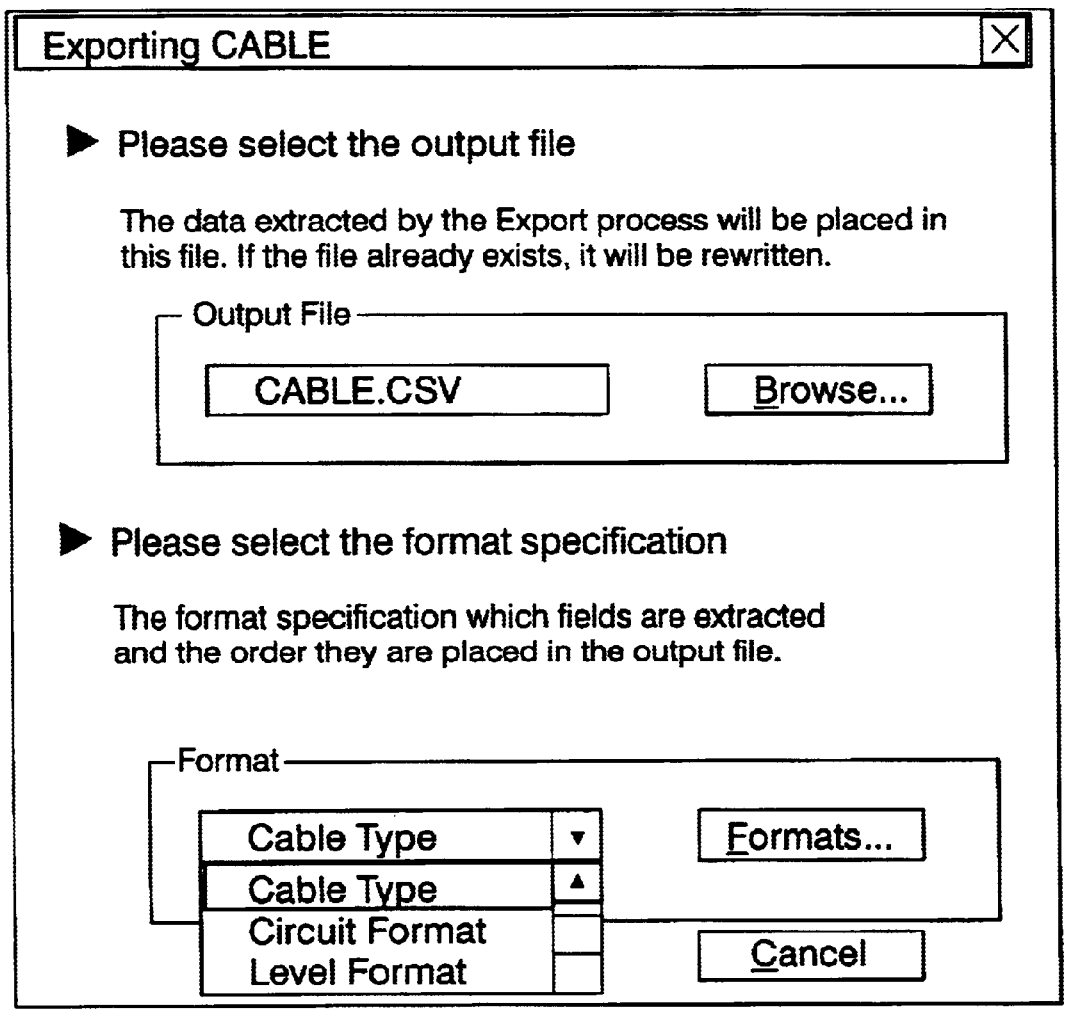
Figure 37B:
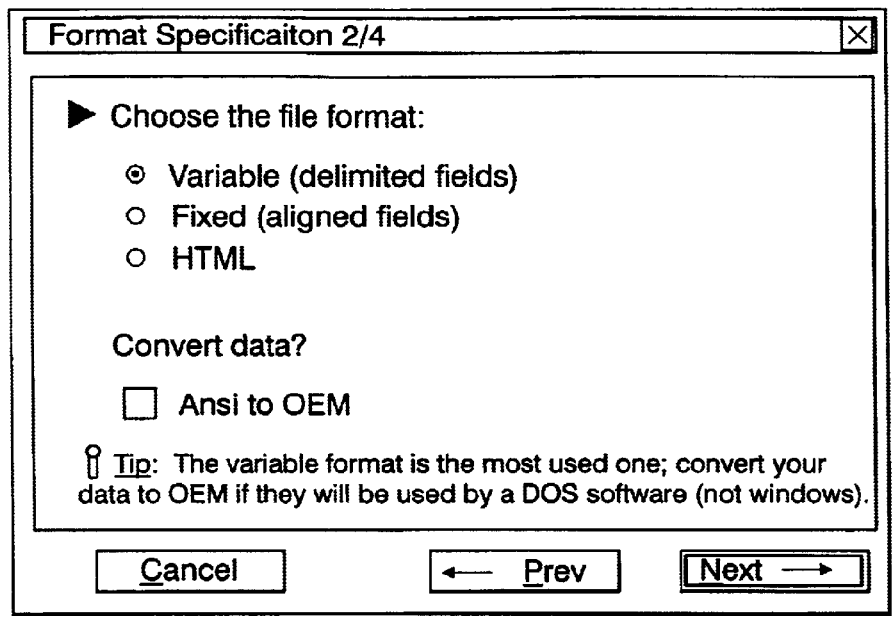
Figure 37C:
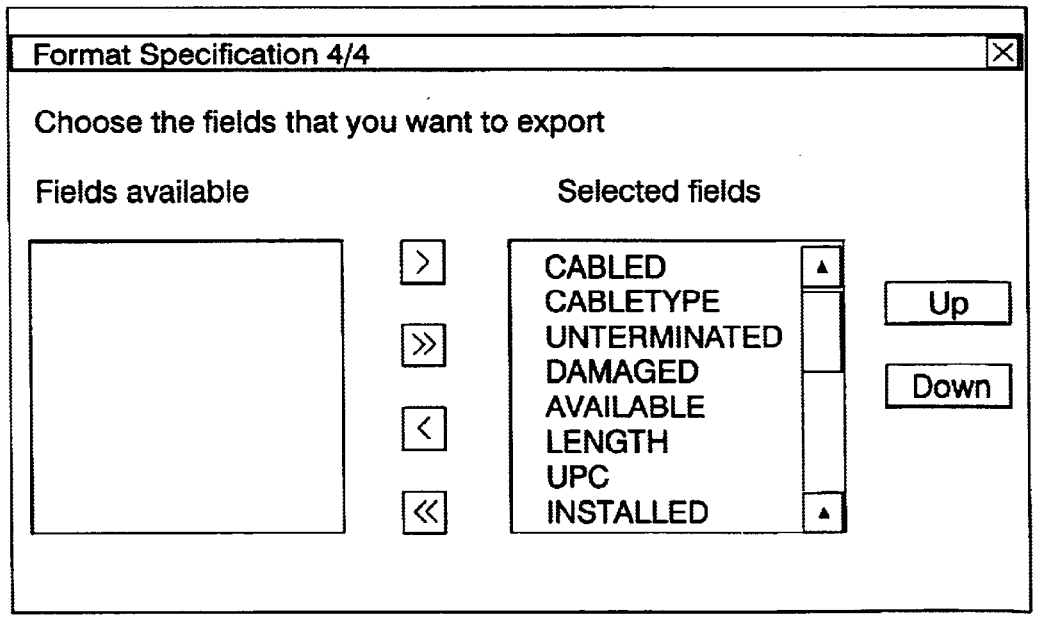

Cable Manager also includes import and export utilities which allow a user to transfer data into and out of Cable Manager in formats common to other programs or in a text file. The import utility is used to initially load the cable database to load the cable manager database by category, subcategory and cable information. FIGS. 36A, 36B and 36C show the user options provided to a user in the form of screens for accomplishing same. The export utility is typically used as a means of transferring information out of Cable Manager in formats common to other programs or in a text file, e.g., for inventory, accounting, or tax program purposes. FIGS. 37A, 37B and 37C show the user options provided to a user in the form of screens for accomplishing same. By using the export utility, cable manager database information may be saved in standard file formats which can be read by other systems or database programs.

The first step in the Cable Manager search process requires the building of a square matrix that lists all the vertices of the graph or graphical representation. The matrix entries correspond to the weight of the edge that connected the particular $row^{th}$ and $column^{th}$ vertices, if it existed. If no connectivity exists, the particular matrix entry is defined as a 0 (zero). Construction of the entire matrix is available from database tables that contain the information about the spaces, cables and hardware within the telecommunication cable system.

The algorithm operates on the matrix to construct a list of all vertices, along with two other entries for each of them. The first entry consists of the "minimum sum of weights" from the initial position and the second entry consists of the last vertex encountered before the given one, that is, the final vertex which produces the minimum sum. Starting from the first vertex, the algorithm inspects each vertex, looks at the adjacency matrix and then adjusts the list of entries for each of them. At the end of the computation, the minimum sum of weight entry corresponding to the final vertex is determined to be the shortest path.

Once the space sequence of the search is determined, the hardware and cables within each space within the path are determined. This is accomplished utilizing a database table within the cable manager database which lists hardware type connectively using cables or cross connects. The table entries imply a direction from the telephone jack towards the PBX. In cases where non-unique connectivity is determined between a given hardware and its next corresponding type, the entry is prioritized with a "one" to denote the highest priority or first preference of that path. Thereafter, the space sequence obtained from the search results in connection with the connectivity table is analyzed to find subsequent cables, cross connects and hardware until the final PBX destination is reached.

In a case where the algorithm determines an incomplete path with missing cables or cross connects between two consecutive pieces of hardware, the user is required to supply additional information via an interactive screen. Once a complete path from the telephone jack to the PBX is determined, the user is then able to connect the cable and cross connect entries with the hardware entries in the database and "stamp" a circuit identifier, which circuit identifier indicates a complete electrical circuit between the points of interest.

While the invention has been particularly shown and described with respect to the illustrated and preferred embodiment, it should be understood by those skilled in the art that the foregoing and other changes in form and details may be made therein without departing from the scope and spirit of the invention that should be limited only by the scope of the claims appended hereto.

What is claimed is:

1. An article of manufacture comprising:
 a computer usable medium having computer readable program code means embodied therein for managing a telecommunications cable system including tracking all hardware components contained in the telecommunications cable system, tracking the capacity of each hardware component, and for selecting a shortest path between said hardware components, the telecommunications cable system comprising a PBX switch and master database, and at least one adjunct system and database, the computer readable program code means comprising:

computer readable program code means for interacting with said master database, said master database containing a copy of information contained in each PBX, adjunct system and each adjunct system's respective database;

computer readable program code means for tracking all telecommunications cabling and hardware components by unique identification number and storing each number in said master database by type based on each unique identification number;

computer readable program code means for accessing said master database by type and generating a graphical representation based upon the unique identification numbers stored in the master database for all communication cables, termination hardware components and cross-connects comprising the telecommunications system to realize available circuit pathways within the telecommunications cable system;

computer readable program code means for accessing said master database by type, for documenting existing circuits and for adding new circuits to the telecommunications cable system, said adding including updating the graphical representation to reflect the added new circuits; and computer readable program code means for selecting a shortest or most efficient path between jack and switch for said new circuit by applying a mathematical algorithm to the updated graphical representation.

2. The article of manufacture of claim 1, further comprising computer readable program code means for graphically connecting database records of said cables and components contained in said master database to generate a graphical view of any of rooms, floors and buildings which may comprise the telecommunications cable system.

3. The article of manufacture of claim 1, further comprising computer readable program code means for accessing said master database including identifying available components for one of an existing and a new circuit, and for generating reports which disclose which cables and components comprising the particular existing or new circuit are currently in use.

4. The article of manufacture of claim 1 wherein the computer readable program code means for tracking further includes means for defining spaces, termination positions, any telecommunications cable components, pathways, locations, termination hardware and assets.

5. The article of manufacture of claim 1, wherein the computer readable program code means depicts the telecommunications cable system as a series of termination-cable-termination segments.

6. The article of manufacture of claim 1, wherein the computer readable program code means provides for a user's ability to create and organize the telecommunications system components with multiple levels of views.

7. The article of manufacture of claim 1, wherein the computer readable program code means provides for the shortest path using DIJKSTRA's algorithm.

8. A program storage device readable by a machine, tangibly embodying a program of instructions executable by the machine to perform method steps for organizing and tracking an internal cable structure of a telecommunications system, comprising the steps of:

labeling each space, termination hardware, termination position, cable and pathway comprising the telecommunications system by type;

entering each said space, termination hardware, termination position, cable and pathway into a master database by type;

connecting all spaces, termination hardware, termination hardware with cross-connects, termination positions, cables and pathways comprising said telecommunications system to generate a graphical representation of the system; and tracking all hardware components contained in the telecommunications system, including selecting a shortest path between components.

9. The program storage device of claim 8, wherein said step of tracking includes documenting existing circuits and adding new circuits to the telecommunications cable system, including updating the graphical representation to reflect the added new circuits.

10. The program storage device of claim 8, wherein said method steps include documenting circuits currently identified as being part of the telecommunications system, and adding new circuits.

11. The program storage device of claim 10, wherein said step of documenting includes performing rule-based searching for identifying new circuits.

12. The program storage device of claim 10, wherein said step of documenting includes defining new search rules and performing searching thereby.

13. The program storage device of claim 8, wherein said method steps include graphically connecting database resident components by creating views of the system's organizational structure.

14. The program storage device of claim 8, wherein said method steps allow a user to view the components comprising an existing circuit within the telecommunications system.

15. The program storage device of claim 8, wherein said method steps include a step for preparing printed reports of information stored in said database.

16. The program storage device of claim 8, wherein said method steps include a step of importing category, subcategory and cable information into the master database.

17. The program storage device of claim 16, wherein said information is imported from one of other systems, another database program and a text file.

18. The program storage device of claim 8, wherein said information is exported from same master database.

* * * * *